(12) United States Patent
Shishkov et al.

(10) Patent No.: US 10,807,100 B2
(45) Date of Patent: Oct. 20, 2020

(54) CONCENTRATE QUALITY

(71) Applicant: BASF SE, Ludwigshafen (DE)

(72) Inventors: Igor Shishkov, Muenster (DE); Wolfgang Rohde, Speyer (DE); Alexej Michailovski, Ludwigshafen (DE); Andreas Luz, Worms (DE); Reinhold Rieger, Mutterstadt (DE); Petra John, Edingen-Neckarhausen (DE); Imme Witte, Weinheim (DE)

(73) Assignee: BASF SE, Ludwigshafen am Rhein (DE)

( * ) Notice: Subject to any disclaimer, the term of this patent is extended or adjusted under 35 U.S.C. 154(b) by 38 days.

(21) Appl. No.: 15/528,952

(22) PCT Filed: Nov. 26, 2015

(86) PCT No.: PCT/EP2015/077736
§ 371 (c)(1),
(2) Date: May 23, 2017

(87) PCT Pub. No.: WO2016/083491
PCT Pub. Date: Jun. 2, 2016

(65) Prior Publication Data
US 2017/0274389 A1 Sep. 28, 2017

Related U.S. Application Data

(60) Provisional application No. 62/085,269, filed on Nov. 27, 2014.

(30) Foreign Application Priority Data

Jan. 9, 2015 (EP) .................................. 15 150 648

(51) Int. Cl.
B03C 1/01 (2006.01)

(52) U.S. Cl.
CPC ............ B03C 1/01 (2013.01); B03C 2201/18 (2013.01)

(58) Field of Classification Search
CPC ............ C12Q 1/6827; C12Q 2537/164; C12Q 1/6883; C12Q 1/6886; C12Q 2600/154; C12Q 2600/172; B03C 1/01; B03C 2201/18; C02F 1/481
USPC ................ 210/695, 222; 209/8, 39
See application file for complete search history.

(56) References Cited

U.S. PATENT DOCUMENTS

| | | |
|---|---|---|
| 4,367,143 A | 1/1983 | Carpenter |
| 4,657,666 A | 4/1987 | Snook et al. |
| 4,946,590 A | 8/1990 | Hertzog |
| 5,051,199 A | 9/1991 | Barwise |
| 5,200,071 A | 4/1993 | Spiegel |
| 8,329,039 B2 | 12/2012 | Domke et al. |
| 8,377,311 B2 | 2/2013 | Domke et al. |
| 8,377,312 B2 | 2/2013 | Domke et al. |
| 8,377,313 B2 | 2/2013 | Domke et al. |
| 8,408,395 B2 | 4/2013 | Domke et al. |
| 8,434,623 B2 | 5/2013 | Domke et al. |
| 8,486,270 B2 | 7/2013 | Rieger et al. |
| 8,715,494 B2 | 5/2014 | Danov et al. |
| 8,840,794 B2 | 9/2014 | Danov et al. |
| 8,858,801 B2 | 10/2014 | Domke et al. |
| 9,028,687 B2 | 5/2015 | Goraj |
| 9,028,699 B2 | 5/2015 | Danov et al. |
| 9,126,206 B2 | 9/2015 | Hartmann et al. |
| 2011/0127201 A1 | 6/2011 | Domke et al. |
| 2011/0168618 A1 | 7/2011 | Danov et al. |
| 2011/0174710 A1 | 7/2011 | Hartmann et al. |
| 2011/0240527 A1 | 10/2011 | Domke |
| 2011/0272623 A1 | 11/2011 | Domke et al. |
| 2011/0303773 A1* | 12/2011 | Domke .................. B03C 1/015 241/24.1 |
| 2012/0000857 A1 | 1/2012 | Domke et al. |
| 2012/0132032 A1* | 5/2012 | Domke .................... C22B 7/04 75/10.67 |
| 2012/0189512 A1 | 7/2012 | Danov et al. |
| 2012/0228413 A1 | 9/2012 | Rieger et al. |
| 2013/0087505 A1 | 4/2013 | Danov et al. |
| 2013/0256233 A1 | 10/2013 | Danov et al. |
| 2013/0313177 A1 | 11/2013 | Danov et al. |

FOREIGN PATENT DOCUMENTS

| | | |
|---|---|---|
| AU | 774023 B2 | 6/2004 |
| AU | 2011224015 A1 | 4/2012 |
| CA | 2832814 A1 | 10/2012 |
| DE | 102010023130 A1 | 12/2011 |
| DE | 202011104707 U1 | 2/2012 |
| DE | 102010061952 A1 | 5/2012 |
| EP | 1200408 A2 | 5/2002 |

(Continued)

OTHER PUBLICATIONS

U.S. Appl. No. 15/128,447, filed Sep. 23, 2016.

(Continued)

Primary Examiner — Claire A Norris

(74) Attorney, Agent, or Firm — Faegre Drinker Biddle & Reath LLP

(57) ABSTRACT

The present invention relates to a process for the separation of at least one valuable matter containing material from a dispersion comprising said at least one valuable matter containing material and at least one second material. The process according to the present invention comprises at least the steps (A) to (E) and the optional steps (F) to (H) which are described herein.

24 Claims, No Drawings

(56) References Cited

FOREIGN PATENT DOCUMENTS

| | | |
|---|---|---|
| EP | 1974821 A1 | 10/2008 |
| SU | 1212969 A1 | 2/1986 |
| WO | WO-0109099 A2 | 2/2001 |
| WO | WO-020066168 A1 | 8/2002 |
| WO | WO-2009010422 A1 | 1/2009 |
| WO | WO-2009065802 A2 | 5/2009 |
| WO | WO-2010007075 A1 | 1/2010 |
| WO | WO-2010007157 A1 | 1/2010 |
| WO | WO-2010031617 A1 | 3/2010 |
| WO | WO-2010066770 A1 | 6/2010 |
| WO | WO-2010097361 A1 | 9/2010 |
| WO | WO-2010100180 A1 | 9/2010 |
| WO | WO-2011058039 A1 | 5/2011 |
| WO | WO-2011107353 A1 | 9/2011 |
| WO | WO-2011131411 A1 | 10/2011 |
| WO | WO-2011134710 A1 | 11/2011 |
| WO | WO-2011154178 A1 | 12/2011 |
| WO | WO-2012072615 A1 | 6/2012 |
| WO | WO-2012104292 A1 | 8/2012 |
| WO | WO-2012107274 A1 | 8/2012 |
| WO | WO-2012116909 A1 | 9/2012 |
| WO | WO-2012140065 A1 | 10/2012 |
| WO | WO-2013038192 A1 | 3/2013 |
| WO | WO-2013167634 A1 | 11/2013 |
| WO | WO-2015110555 A1 | 7/2015 |

OTHER PUBLICATIONS

U.S. Appl. No. 15/527,820, filed May 18, 2017.
U.S. Appl. No. 15/527,820, filed May 18, 2017, Garrido et al.
International Search Report for PCT/EP2015/077736 dated Mar. 16, 2016.
International Search Report for PCT/EP2015/077918 dated Feb. 9, 2016.
Written Opinion of the International Searching Authority for PCT/EP2015/077736 dated Mar. 16, 2016.
Written Opinion of the International Searching Authority for PCT/EP2015/077918 dated Feb. 9, 2016.

* cited by examiner

CONCENTRATE QUALITY

CROSS-REFERENCE TO RELATED APPLICATIONS

This application is a national stage application (under 35 U.S.C. § 371) of PCT/EP2015/077736, filed Nov. 26, 2015, which claims benefit of U.S. application Ser. No. 62/085,269, filed Nov. 27, 2014, and European Application No. 15150648.2, filed Jan. 9, 2015, all of which are incorporated herein by reference in their entirety.

The present invention relates to a process for the separation of at least one valuable matter containing material from a dispersion comprising said at least one valuable matter containing material and at least one second material.

BACKGROUND OF THE INVENTION

Several processes for the separation of a desired material from a mixture comprising this desired material and, in addition, undesired materials are described in the prior art.

WO 02/066168 A1 relates to a process for separating ores from mixtures comprising these, in which suspensions or slurries of these mixtures are treated with particles which are magnetic and/or capable of floating and/or reporting to the froth phase of flotation in aqueous solutions. After addition of the magnetic particles and/or particles capable of floating, a magnetic field is applied so that the agglomerates are separated from the mixture. However, the extent to which the magnetic particles are bound to the ore and the strength of the bond is not sufficient for the process to be carried out with a satisfactorily high yield and effectiveness.

U.S. Pat. No. 4,657,666 discloses a process for the enrichment of ore minerals, in which the ore mineral present in the gangue is treated with magnetic particles, as a result of which agglomerates are formed due to hydrophobic interactions. The magnetic particles are hydrophobized on the surface by treatment with hydrophobic compounds, so that agglomeration to the ore minerals occurs. The agglomerates are then separated off from the mixture by means of a magnetic field. It is disclosed that the ores are treated with a surface-activating solution of sodium ethylxanthate, which may also be called sodium ethylxanthogenate, before the magnetic particle is added. In this process, separation of ore minerals and magnetic particle is effected by the destruction of the surface-activating substance which has been applied in the form of the surface-activating solution to the ore.

WO 2010/100180 A1 relates to an agglomerate of at least one particle P which is hydrophobized on the surface with at least one first surface-active substance and at least one magnetic particle MP which is hydrophobized on the surface with at least one second surface-active substance, a process for producing these agglomerates and the use of the agglomerates for separating a particle P from mixtures comprising these particles P and further components.

WO 2010/097361 A1 relates to a process for separating at least one first material from a mixture comprising this at least one first material, at least one second material and at least one third material, wherein the mixture to be treated is firstly brought into contact with at least one hydrocarbon in an amount of from 0.01 to 0.4% by weight, based on the sum of mixture and at least one hydrocarbon, this mixture is further brought into contact with at least one hydrophobic magnetic particle so that the magnetic particle and the at least one first material agglomerate and this agglomerate is separated from the at least one second material and the at least one third material by application of a magnetic field and, if appropriate, the at least one first material is subsequently separated, preferably quantitatively, from the magnetic particle, with the magnetic particle preferably being able to be recirculated to the process.

WO 2010/066770 A1 discloses a process for separating at least one first material from a mixture comprising this at least one first material in an amount of from 0.001 to 1.0% by weight, based on the total mixture, and at least one second material, in which the first material is firstly brought into contact with a surface-active substance in order to hydrophobize it, i.e. to render it hydrophobic, this mixture is then brought into contact with at least one magnetic particle so that the magnetic particle and the hydrophobized first material agglomerate and this agglomerate is separated from the at least one second material by application of a magnetic field and the at least one first material is then preferably quantitatively separated from the magnetic particle, with the magnetic particle preferably being able to be recirculated to the process.

WO 2010/007157 A1 discloses a process for separating at least one first material from a mixture comprising this at least one first material and at least one second material, in which the mixture to be separated is firstly brought into contact with at least one selective hydrophobizing agent so that an adduct is formed from the at least one hydrophobizing agent and the at least one first material, this adduct is then brought into contact with at least one magnetic particle functionalized on the surface with at least one polymeric compound having an LCST (lower critical solution temperature) at a temperature at which the polymeric compound has hydrophobic character so that the adduct and the at least one functionalized magnetic particle agglomerate, this agglomerate is separated off by application of a magnetic field and the agglomerate is subsequently dissociated by setting a temperature at which the polymeric compound has hydrophilic character.

WO 2010/007075 A1 relates to a process for separating at least one first material from a mixture comprising this at least one first material and at least one second material, in which the mixture to be separated is brought into contact with at least one bifunctional compound and at least one magnetic particle so that an adduct is formed from the at least one first material, the at least one bifunctional compound and the at least one magnetic particle, this adduct is dispersed in a suitable dispersion medium, the adduct is separated off by application of a magnetic field and the adduct which has been separated off is, if appropriate, disassociated by suitable measures in order to obtain the at least one first material.

WO 2009/065802 A2 relates to a process for separating at least one first material from a mixture comprising this at least one first material and at least one second material, in which a suspension of the mixture comprising at least one first material and at least one second material and at least one magnetic particle in a suitable suspension medium is firstly produced, the pH of this suspension is set to a value at which the at least one first material and the at least one magnetic particle bear opposite surface charges so that these agglomerate, the agglomerates obtained in this way are separated off by application of a magnetic field gradient and the agglomerates which has been separated off are dissociated by setting the pH to a value at which the at least one first material and the at least one magnetic particle bear the same surface charges in order to obtain the at least one first material separately.

U.S. 20120132032 A1 discloses a process for the separation of at least one metal from a slag, comprising that at least one metal and further components, comprising at least step (A) grinding the slag, (B) if appropriate, contacting the ground slag of step (A) with at least one surface-active substance and/or at least one magnetic particle, if appropriate in the presence of at least one dispersant, resulting in formation of agglomerates of the at least one metal and the at least one magnetic particle, (C) if appropriate, addition of at least one dispersant to the mixture obtained in step (B) to give a dispersion having a suitable concentration, and (D) separation of the agglomerates from the mixture of step (B) or (C) by application of a magnetic field, and to the use of at least one magnetic particle for the separation of slag. The use of magnetic particles can be optional if the slag contains magnetically separable, valuable-containing particles.

The processes for separating a desired valuable matter containing material from a mixture comprising this desired material and further undesired materials that are disclosed in the prior art can still be improved in respect of the yield of desired valuable matter and/or in respect of the grade of the obtained desired valuable material in agglomerates comprising the desired valuable matter containing material. An improvement of this separation process will further increase the efficiency of the whole valuable matter recovery process chain. For example, while upgrading the desired material in the process of the invention, the amount of material to be treated in subsequent steps may be significantly lowered and thus, the whole valuable matter recovery process may be performed using less energy.

Further, the presence of disturbing and potentially toxic compounds, such as chromium or chromium comprising minerals, may also be undesired and for example may increase the risk of contamination of the personal handling the material. It is also known that chromium comprising minerals increase the melting point and thus lead to melt crystallization in a smelter oven affording high additional processing costs.

It is therefore an object of the present invention to provide a process for the separation of at least one valuable matter containing material from a dispersion that also comprises further undesired materials. Furthermore, it is an object of the present invention to improve the grade of said at least one valuable matter containing matter in said separation process.

It is also an object to provide a process for separating at least one valuable matter containing material from a dispersion comprising at least one valuable matter containing material and undesired materials such as toxic or undesired metals that also decreases the amount of potentially toxic and undesired metals such as chromium.

SUMMARY

These objects are solved by the process according to the present invention for the separation of at least one valuable matter containing material from a dispersion comprising said at least one valuable matter containing material and at least one second material, wherein the process comprises the following steps:
(A) providing a first dispersion I comprising a dispersion medium I, the at least one valuable matter containing material and the at least one second material;
(B) contacting dispersion I of step (A) with at least one magnetic particle;
(C) separating a first magnetic fraction I from dispersion I by applying a magnetic field, wherein the magnetic fraction I comprises the at least one magnetic particle and the at least one valuable matter containing material;

(D) redispersing the magnetic fraction I in at least one dispersion medium II to obtain a dispersion II; and
(E) separating a second magnetic fraction II from dispersion II, wherein the magnetic fraction II comprises at least one magnetic particle and at least one valuable matter containing material;

and the optional steps of:
(F) redispersing the at least one magnetic fraction II in dispersion medium III to obtain a dispersion III;
(G) separating dispersion III into a third magnetic fraction III and a non-magnetic fraction and isolating the at least one valuable matter containing material from the non-magnetic fraction; and
(H) processing of the at least one magnetic fraction II obtained in step (E), the non-magnetic fraction obtained in step (G) and/or the isolated at least one valuable matter containing material obtained in step (G) by smelting, extracting and/or wet chemical refining.

DETAILED DESCRIPTION

The present invention relates to a process for the separation of at least one valuable matter containing material from a dispersion comprising said at least one valuable matter containing material and at least one second material, wherein the process comprises the following steps:
(A) providing a first dispersion I comprising a dispersion medium I, the at least one valuable matter containing material and the at least one second material;
(B) contacting dispersion I of step (A) with at least one magnetic particle;
(C) separating a first magnetic fraction I from dispersion I by applying a magnetic field, wherein the magnetic fraction I comprises the at least one magnetic particle and the at least one valuable matter containing material;
(D) redispersing the magnetic fraction I in at least one dispersion medium II to obtain a dispersion II; and
(E) separating a second magnetic fraction II from dispersion II, wherein the magnetic fraction II comprises at least one magnetic particle and at least one valuable matter containing material.

The process according to the present invention and its preferred embodiments will be explained in detail in the following.

In a preferred embodiment of the process of the invention, the at least one valuable matter containing material comprises one or more desired valuable matter, such as metals, in any form. The at least one valuable matter containing material may comprise sulfidic ore minerals, oxidic ore mineral, carbonate-comprising ore minerals, metals in elemental form, alloys comprising metals, compounds comprising metals and mixtures thereof.

In another preferred embodiment, the at least one valuable matter containing material comprises metals such as Ag, Au, Pt, Pd, Rh, Ru, Ir, Os, Cu, Mo, Ni, Mn, Zn, Pb, Te, Sn, Hg, Re, V, Fe or mixtures thereof, preferably in the native state or as sulphides, phosphides, selenides, arsenides, tellurides or ore minerals thereof. In a further preferred embodiment, these metals are present in form of alloys such as alloys with other metals such as Fe, Cu, Mo, Ni, Pb, Sb, Bi; with each other; and/or compounds containing non-metals such as phosphides, arsenides, sulphides, selenides, tellurides and the like. The alloys of these metals or their compounds with iron or platinum may for example occur in slags obtained after smelting of spent automotive catalysts.

In a preferred embodiment, the at least one valuable matter containing material comprises an FePt alloy.

In a preferred embodiment, the at least one valuable matter containing material comprises Ag, Au, Pt, Pd, Rh, Ru, Ir, Os, Cu, Mo, Ni, Mn, Zn, Pb, Te, Sn, Hg, Re, V, or mixtures thereof; or alloys thereof, preferably with each other and/or with elements like Fe, Ni or Pd.

In a preferred embodiment, the at least one valuable matter containing material comprises Au, Pt, Ir, Pd, Os, Cu, Mo, Ag, Hg, Rh, Ru or combinations thereof, preferably Au, Pt, Pd or Rh or combinations thereof, and more preferably Pt, Pd or Rh or combinations thereof.

In a preferred embodiment, the at least one valuable matter containing material comprises Ru, Rh, Pd, Os, Cu, Mo, Ir, Pt or combinations or alloys thereof.

In a preferred embodiment, the at least one valuable matter containing material comprises Rh, Pd, Cu, Mo, Pt or combinations or alloys thereof.

In one preferred embodiment, the at least one valuable matter containing material is present in form of an ore mineral.

In a preferred embodiment, the at least one valuable matter containing material comprises ore minerals, preferably ore minerals such as sufidic ore minerals for example pyrite ($FeS_2$), galena (PbS), braggite (Pt,Pd,Ni)S, argentite ($Ag_2S$) or sphalerite (Zn, Fe)S, oxidic and/or carbonate-comprising ore minerals, for example azurite [$Cu_3(CO_3)_2$(OH)$_2$] or malachite [$Cu_2[(OH)_2[CO]$], rare earth metals comprising ore minerals like bastnaesite (Y, Ce, La)CO$_3$F, monazite (RE)PO$_4$ (RE=rare earth metal) or chrysocolla $(CuAl)_2H_2Si_2O_5(OH)_4 \cdot nH_2O$.

In one embodiment, the at least one valuable matter is present in form of sulfidic ore minerals such as copper ore minerals comprising covellite CuS, molybdenum(IV) sulfide, chalcopyrite (cupriferous pyrite) $CuFeS_2$, bornite $Cu_5FeS_4$, chalcocite (copper glance) $Cu_2S$ or pentlandite $(Fe,Ni)_9S_8$.

In another preferred embodiment, the at least one valuable matter is present in form of solid solutions of metals such as Pd, Pt, Rh, Au, Ag, Ru, Re in the above mentioned sulfides, and mixtures thereof.

In another preferred embodiment, the at least one valuable matter containing material comprises tellurides and arsenides of metals such as Pd, Pt, Rh, Au, Ag, Ru, Re or other slow-floating precious-metal containing compounds such as Pt—(Pd)—As—S systems like $PtAs_2$ (sperrylite), $Pd_2As$ (palladoarsenide), $PdeAs_3$ (stillwaterite), PtAsS (platarsite) or other sulfarsenides like (Pt, Ir, Ru)AsS solid solutions; kotulskite PdTe (and its Bi-rich form); merenskyite $PdTe_2$ (as well as its intermediate phases in the merenskykite-michenerite solid solutions); michenerite PdBiTe, Pd-bismuthotelluride $Pd_8Bi_6Te_3$; sopcheite ($Pd_3Ag_4Te_4$); guanglinite ($Pd_3As$); palladium arsenide (Pd—As); palladium antimonide (Pd—Sb); paolovite ($Pd_2Sn$); $Pd_{1.6}As_{1.5}Ni$, moncheite (Pt, Pd)(Bi, Te)$_2$; $PtTe_2$; or PtS (cooperite) and PdS (vysotskite) which may also crystallize from arsenide- or telluride-bearing sulfide melts and thus contain at least some As or Te.

In one preferred embodiment, the at least one valuable matter containing material comprises a valuable matter of platinum group metals (PGM), i.e. Pd, Pt, Rh, Os, Ir or Ru, in an amount of from 0.5 to 50 ppm, preferably of 0.5 to 4 ppm and more preferably of about 1 ppm, relative to the dry weight of the material. In a more preferred embodiment, these PGM metals may be present as solid solution in other sulfidic minerals such as pentlandite. The pentlandite content relative to the dry weight of the valuable matter containing material and at least one second material may, for example, be from 0.1 to 2% by weight and preferably from 0.8 to 1.2% by weight.

The at least one second material may be any undesired material. In a preferred embodiment, the at least one second material is a hydrophilic material. In one embodiment, the at least one second material is a hydrophilic metal compound or a hydrophilic semimetal compound. In one embodiment, the at least one second material comprises oxidic metal or semimetal compounds, carbonate comprising metal or semimetal compounds, silicate comprising metal or semimetal compounds, sulfidic metal or semimetal compounds, hydroxidic metal or semimetal compounds or mixtures thereof. Suitable oxidic metal or semimetal compounds which may be present as the at least one second material according to the invention include, but are not limited to, silicon dioxide ($SiO_2$), silicates, aluminosilicates, such as feldspars, albite ($Na(Si_3Al)O_8$), mica, for example muscovite ($KAl_2[(OH,F)_2AlSi_3O_{10}]$), garnets (Mg, Ca, $Fe^{II}$)(A, $Fe^{III})_2(SiO_4)_3$ and further related minerals and mixtures thereof.

In one embodiment of the process according to the invention, the at least one second material is selected from the group consisting of $SiO_2$, CaO, $Al_2O_3$, MgO, $P_2O_3$, $ZrO_2$, $Fe_2O_3$, $Fe_3O_4$, $CeO_2$, $Cr_2O_3$, complex oxide matrices and mixtures thereof.

In a preferred embodiment, the at least one second material comprises chromium or chromium-containing compounds or minerals or mixtures thereof.

Accordingly, in a preferred embodiment of the present invention the dispersion comprising the at least one valuable matter containing material and the at least one second material may comprise untreated ore and/or ore mineral mixtures obtained from mines.

In one of the embodiment, a typical ore mixture which can be separated by means of the process of the invention may have the following composition:

(i) about 30% by weight of $SiO_2$ and about 30% by weight of feldspar (e.g. $Na(Si_3Al)O_8$) as an example of a preferred at least one second material; and about 0.05% by weight of $MoS_2$, balance chromium, iron, titanium and magnesium oxides; and (ii) Pd, Pt and/or Rh, each in a grade of from 0.5 to 50 ppm, from 0.5 to 4 ppm, or about 1 ppm, relative to the whole composition as an example of a preferred at least one valuable matter. Said metals may be present as solid solution in other sulfidic minerals like pentlandite. The pentlandite content relative to the whole mixture to be treated may be 0.1 to 2% by weight, for example 0.8 to 1.2% by weight.

The individual essential and optional steps of the process according to the present invention are explained in detail in the following. Each single step and/or the whole process of the present invention may be conducted continuously or discontinuously, wherein conducting each single step and the whole process continuously is preferred.

Step (A):

Step (A) of the process according to the present invention comprises providing a first dispersion I comprising a dispersion medium I comprising the at least one valuable matter containing material and at least one second material.

Suitable dispersion mediums for step (A) of the present invention are water or lower alcohols, such as $C_1$-$C_4$-alcohols.

In a preferred embodiment, the dispersion medium I is a non-flammable solvent, such as water.

In a further embodiment of the present invention, the first dispersion I comprising a dispersion medium I and at least one valuable matter containing material and at least one second material comprises slag, for example smelter slag or furnace slag. These materials are in general known to the skilled artisan. In a preferred embodiment, the slag may be furnace slag resulting from processing concentrates from platinum group metals (PGMs) bearing ores, spent catalyst materials or mixtures thereof.

In a preferred embodiment, the first dispersion I comprises slag, and preferably furnace slag, which is obtained from smelting processes known to the skilled artisan, for example smelting processes to obtain metals such as Mo, Cu, Ni, Ag, Hg, Au, Pt, Pd, Rh, Ru, Ir, Os or mixtures thereof.

In a preferred embodiment, the first dispersion I comprising a dispersion medium I, at least one valuable matter containing material and at least one second material comprises furnace slag. Said furnace slag may be obtained as a product, for example an end-product, a by-product and/or as a waste-product of smelting processes.

In a preferred embodiment of the present invention, the first dispersion I comprising a dispersion medium I, at least one valuable matter containing material and at least one second material comprises smelter slag, wherein preferably the smelter slag is obtained from the mixing layer.

In a preferred embodiment of the process according to the present invention, the first dispersion I comprising a dispersion medium I, at least one valuable matter containing material and at least one second material comprises artificially prepared slag.

In one embodiment, the first dispersion I comprising a dispersion medium I, at least one valuable matter containing material and at least one second material comprises furnace slag comprising at least one valuable matter and from 5 to 80% by weight $SiO_2$, from 20 to 50% by weight CaO, from 0 to 60% by weight $Al_2O_3$, from 0 to 10% by weight MgO, from 0 to 10% by weight $P_2O_5$, from 0 to 10% by weight $ZrO_2$, from 0 to 10% by weight $Fe_2O_3$, and optionally other iron oxides, from 0 to 10% by weight $CeO_2$, and optionally other components, wherein the % are based on the total weight of the furnace slag.

In another preferred embodiment, the first dispersion I comprising a dispersion medium I, the at least one valuable matter containing material and at least one second material comprises slag which may contain further components such as lead- and/or iron-containing compounds and/or lead and/or iron in metallic form. In a preferred embodiment, iron containing compounds like magnetite are present in the slag to be separated.

In another preferred embodiment, the first dispersion I comprising a dispersion medium I, at least one valuable matter containing material and at least one second material comprises slag containing at least one valuable matter in an amount of from 0.01 to 1000 g/t or from 0.01 to 500 g/t slag. Slag materials containing the desired at least one valuable matter in lower or higher amounts are also within the scope of the present invention.

According to a particularly preferred embodiment of the present invention, the first dispersion I comprises slag comprising at least one valuable matter selected from Ag, Au, Pt, Pd, Rh, Ru, Ir, Os, Zn, Pb, Te, Sn, Hg, Re, V or Fe and I or the base metals sulphides of Cu, Mo, Ni and Mn or others in an amount of from 0.01 to 1000 g/t slag.

In a preferred embodiment, the first dispersion I comprising a dispersion medium I, at least one valuable matter containing material and at least one second material comprises ore-bearing slag and/or wet ore tailings.

In a preferred embodiment of the process of the invention, the first dispersion I comprises at least one valuable matter containing material and at least one second material in the form of particles having a particles size of from 100 nm to 400 µm. Such particles may be prepared as shown in U.S. Pat. No. 5,051,199. In a preferred embodiment, the particle size is obtained by comminuting, for example by milling. Suitable processes and apparatuses for comminuting are known to those skilled in the art and examples thereof include wet milling in a ball mill. In a preferred embodiment of the process of the present invention, the dispersion comprising at least one valuable matter containing material and the at least one second material is therefore comminuted, preferably milled, to particles having a particles size of from 100 nm to 400 µm before or during step (A). Analytical methods for determining the particle size are known to the skilled artisan and for example include Laser Diffraction or Dynamic Light Scattering for particle sizes of 100 nm to 10 µm or sieve analysis for particles having particle sizes from about 10 µm to about 400 µm.

In a preferred embodiment of the present invention, at least one milling additive may be added before or during the milling of the at least one valuable matter containing material and the at least one second material. The at least one milling additive is preferably added in an amount of from 5 g/t to 10000 g/t, based on the weight of material to be milled. Examples of suitable milling additives include organic polymers that may be used as clay dispersants. Said polymers may additionally decrease slurry viscosities during milling and thus decrease the energy costs of the milling step, or even increase the grade of the separated valuable matter containing material. Examples of such commercially available polymers include carboxymethylcelluloses, such as carboxymethylcelluloses in neutral or neutralized form. Examples also include the Antiprex product line of BASF SE.

According to a preferred embodiment of the present invention, comminuting is conducted during step (A).

Step (B):

Step (B) of the process according to the present invention comprises contacting the dispersion I of step (A) with at least one magnetic particle, preferably so that the at least one valuable matter containing material and the at least one magnetic particle become attached to one another and form at least one magnetic agglomerate. The agglomeration between the at least one valuable matter containing material and the at least one magnetic particle may generally occur as a result of all attractive forces known to those skilled in the art, for example as a result of hydrophobic interactions and/or magnetic forces. Preferably, essentially only the at least one valuable matter containing material and the at least one magnetic particle agglomerate in step (A) while the at least one second material and the at least one magnetic particle do not or essentially do not agglomerate together.

In a preferred embodiment of the process of the invention, the at least one valuable matter containing material and the at least one magnetic particle agglomerate as a result of hydrophobic interactions or due to different surface charges. The agglomeration may be at least partly due to the treatment of the at least one valuable matter containing material and/or magnetic particle with a surface-modifying agent. For example, the international publications WO 2009/010422, WO 2009/065802 WO2010/007075 and WO2010/007157 disclose surface-modifying agents which selectively couple the at least one valuable matter containing material and the at least one magnetic particle.

In a preferred embodiment of the process according to the present invention, the at least one valuable matter containing material and the at least one magnetic particle agglomerate as a result of hydrophobic interactions.

In a preferred embodiment, the at least one valuable matter containing material has been treated with at least one collector before step (A), in step (A) and/or in step (B) of the process of the present invention.

In a preferred embodiment, the contact angle between the particle comprising the at least one valuable containing material treated with at least one collector and water against air is >90°. Thus, in a preferred embodiment, the treatment with the collector renders the at least one valuable matter containing material hydrophobic.

In one embodiment, the at least one valuable matter containing material has been treated with at least ionizing collector or non-ionizing collector or mixtures thereof.

In a preferred embodiment, the at least one valuable matter containing material has been treated with an ionizing collector, i.e. with a cationic or anionic collector.

In one embodiment, the at least one collector is a polymer, for example at least one of the polymers described in WO 2013/038192.

According to a preferred embodiment of the process according to the present invention, the at least one collector is a compound of the general formula (I) or derivative thereof $$[(A)_m(Z)_n]_o \quad (I)$$

wherein each A is independently selected from linear or branched $C_1$-$C_{30}$-alkyl, $C_2$-$C_{30}$-alkenyl $C_1$-$C_{30}$-heteroalkyl, optionally substituted $C_6$-$C_{30}$-aryl, $C_6$-$C_{30}$-cycloalkyl, $C_6$-$C_{60}$-heteroalkyl, $C_6$-$C_{30}$-heterocycloalkyl, $C_6$-$C_{30}$-aralkyl, each of which may be unsubstituted or optionally substituted;
and each Z is independently selected from anionic groups, cationic groups or non-ionic groups;
m is an integer number of 1, 2, 3, 4, 5, 6, 7, 8, 9 or 10;
n is an integer number of 1, 2, 3, 4, 5, 6, 7, 8, 9 or 10; and
o s an integer number of 1, 2, 3, 4, 5, 6, 7, 8, 9 or 10 to 100.

It is understood that formula (I) includes all possible combinations of how each A and each Z may be attached to one another. This includes any linear attachment, such as in -A-A-Z-Z-, A-Z-A-Z-, -Z-A-Z-A- and the like; branched, attachments, such as in

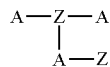

and the like; and circular attachments such as in

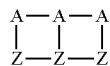

and the like. The skilled person is able to identify suitable attachment sites, such as substitution sites, in substituent A and Z that allow the attachment.

Furthermore, particularly preferred attachment sites are indicated in the respective definition of substituent Z.

In a particularly preferred embodiment, A is a linear or branched $C_1$-$C_{14}$-alkyl, and preferably a linear $C_4$-alkyl or $C_8$-alkyl.

In a further preferred embodiment, A is preferably a branched $C_1$-$C_{20}$-alkyl, particularly preferably a branched $C_6$-$C_{14}$-alkyl, wherein preferably at least one branch, preferably a branch having 1 to 6 carbon atoms, is attached in 2-position, such as in 2-ethylhexyl and/or 2-propylheptyl. Corresponding compounds being substituted in 2-position are, for example, obtained using the Guerbet reaction that is known to the skilled artisan as one reaction step.

In a preferred embodiment, Z is selected as an anionic group. Non-limiting examples of anionic groups are

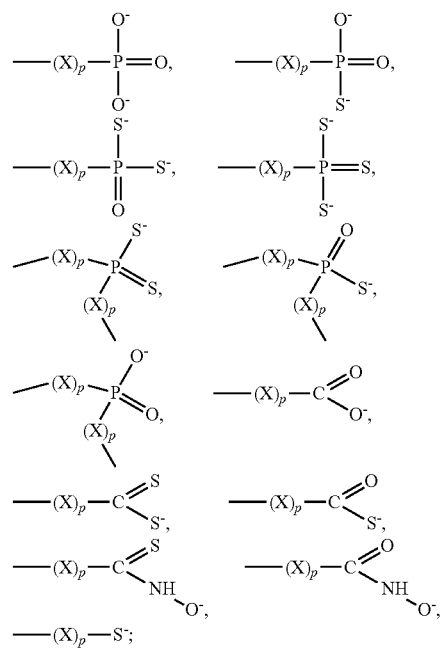

wherein each X is independently selected from the group consisting of O, S, NH, $CH_2$; and each p is independently selected from 0, 1 or 2.

In a preferred embodiment, the anionic group is present as a salt with at least one cation wherein preferably the at least one cationic counter ion is selected from the group consisting of hydrogen, $N(R^1)_4^+$; wherein each $R^1$ is independently selected from hydrogen, $C_1$-$C_8$-alkyl, hydroxy-substituted $C_1$-$C_8$-alkyl or $C_1$-$C_8$-heteroalkyl, preferably HO—$CH_2CH_2$— or HO—$CH_2CH_2$—O—$CH_2CH_2$—; alkali- or earth alkali metals, preferably sodium or potassium; or combinations thereof.

The negatively charged anionic groups may of course also be present in a protonated form, depending, for example, on the pH-value of the aqueous environment. For example, the —$(X)_p$—S-anion group may be present as a —$(X)_p$—SH neutral group.

In another preferred embodiment, Z is selected as a cationic group. Non-limiting examples of cationic groups include, but are not limited to,

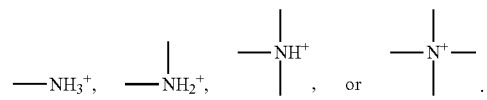

The cationic group may of course also be present in a deprotonated form, depending, for example, on the pH-value. For instance, —$NH_3$ may also be present as —$NH_2$.

In another preferred embodiment, Z is selected as a non-ionic group. Examples of non-ionic groups include, but are not limited to, —$X_A$—,

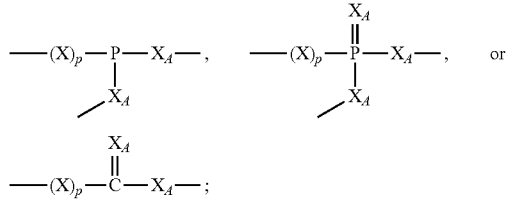

wherein each X is defined as indicated above and each $X_A$ is independently O or S.

In a preferred embodiment, the at least one collector is a compound of formula (IA) or derivative thereof

A-$Z_1$-A    (IA)

wherein each A is selected as described above and wherein $Z_1$ is selected from the group consisting of

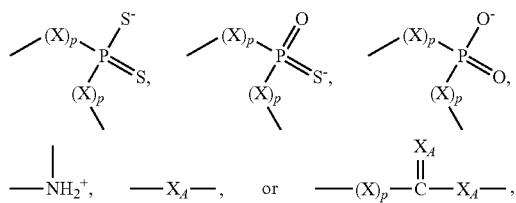

wherein X, $X_A$ and p are defined as described above.

In another preferred embodiment, the at least one collector is a compound of formula (IB) or derivative thereof

A-$Z_1$-A-$Z_2$    (IB)

wherein A and $Z_1$ are defined as described above and wherein $Z_2$ is selected from the group consisting of

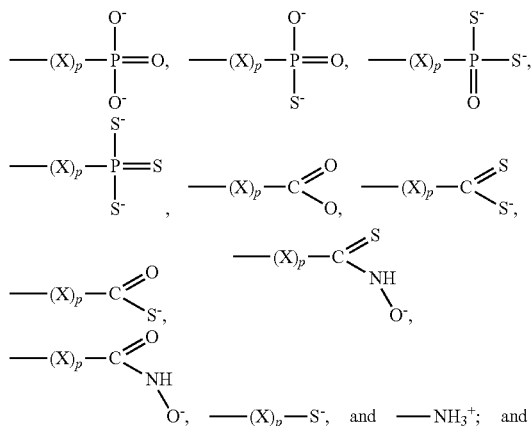

wherein X and p are as defined above.

In yet another preferred embodiment, the at least one collector is a compound of formula (IC) or derivative thereof

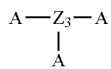    (IC)

wherein A is selected as defined above and wherein $Z_3$ is selected from the group consisting of

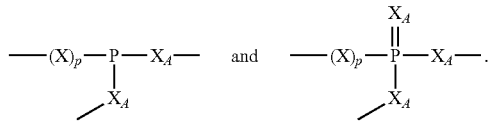

In yet another preferred embodiment, the at least one collector is a compound of formula (ID) or formula (IE),

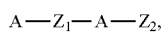    (ID)

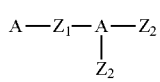    (IE)

wherein A, $Z_1$, and $Z_2$ are defined as described above.

In yet another embodiment, the at least one collector is a compound of formula (IF) or (IG) or derivatives thereof A—[$Z_1$—A]$_q$—$Z_2$    (IF)

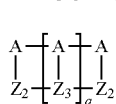    (IG)

wherein q is an integer of 1, 2, 3, 4 or 5 to 100 and A, Z, $Z_2$ or $Z_3$ are defined as described above.

In a further preferred embodiment, the at least one collector is selected from
(i) xanthates, preferably xanthates of formula (IH) or (IJ) or derivatives thereof

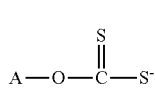    (IH)

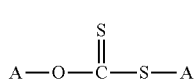    (IJ)

(II) dithiophosphates, preferably dithiophosphates of formula (IK) or derivatives thereof

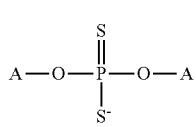    (IK)

(iii) dithiophosphinates, preferably dialkyldithiophosphinates of formula (IL) or derivatives thereof

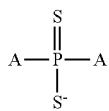

(iv) dialkyldithiocarbamates, preferably dialkyldithiocarbamates of formula (IM) or derivatives thereof

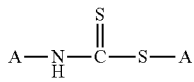

or
(v) alkyltrithiocarbamates preferably alkyltrithiocarbamates of formula (IN) or derivatives thereof

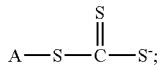

or mixtures thereof, wherein each A is defined as described above. In a preferred embodiment, each A is independently selected from a group consisting of a linear or branched and preferably linear $C_6$-$C_{20}$-alkyl, more preferably n-octyl; or a branched $C_6$-$C_{14}$-alkyl, wherein the branch is preferably located in 2-position, for example 2-ethylhexyl and/or 2-propylheptyl.

In an especially preferred embodiment, the at least one collector is selected from the group consisting of sodium- or potassium-n-octylxanthate, sodium- or potassium-butylxanthate, sodium- or potassium-di-n-octyldithiophosphinate, sodium- or potassium-di-n-octyldithiophosphate, sodium- or potassium-di-n-octyldithiocarbamates, sodium- or potassium-ethyl-hexyl-xanthate and mixtures thereof.

In a particularly preferred embodiment, the at least one collector is selected from the group consisting of potassium-n-octyl xanthate (1:1 salt of carbonodithionic acid O-ocytyl ester) or potassium-di-n-octyldithiophosphinate or mixtures thereof.

In a preferred embodiment, preferred collectors for valuable matter containing material wherein the at least one valuable matter is a noble metal, such as Au, Pd, Rh, Cu, Mo, etc., are monothiols, dithiols and trithiols, or 8-hydroxyquinolines and preferably, the monothiols, dithiols and trithiols, or 8-hydroxyquinolines as described in EP 1 200 408.

In another preferred embodiment, preferred collectors for valuable matter containing material wherein the at least one valuable matter is a metal sulfide, such as $Cu_2S$, $MoS_2$, $FeS_2$ etc., are monothiols, dithiols and trithiols, xanthates or dithiophosphates.

In a preferred embodiment, the at least one collector is used in an amount which is sufficient to achieve the desired effect. In a preferred embodiment, the at least one collector is added in an amount of from about 0.0001 to about 1% by weight and preferably from about 0.001 to about 0.1% by weight in each case based on the weight of total dry solid content.

In general, the at least one magnetic particle in step (B) of the process according to the present invention may be any magnetic particle.

In a preferred embodiment, the at least one magnetic particle is selected from the group consisting of magnetic metals, preferably irons, cobalt, nickel and mixtures thereof; ferromagnetic alloys of magnetic metals, for example NdFeB, SmCo and mixtures thereof; magnetic iron oxides, for example magnetite, magnetic hematite, hexagonal ferrites; cubic ferrites of the general formula (II)

$$M^{2+}_xFe^{2+}_{1-x}Fe^{3+}_2O_4 \qquad (II)$$

where
M is selected from Co, Ni, Mn, Zn and mixtures thereof and x is ≤1;
and mixtures thereof.

In a particularly preferred embodiment, the at least one magnetic particle is magnetite. Magnetite is known to the skilled artisan and is commercially available, e.g. as magnetic pigment 345 (BASF SE) or magnetite from Höganäs. Furthermore, processes for the preparation of magnetite are known to those skilled in the art.

The at least one magnetic particle that is used in accordance with the present invention has in general an average diameter that enables this particle to efficiently agglomerate with the at least one valuable matter containing material. In a preferred embodiment, the magnetic particle has a $d_{80}$ of from 1 nm to 10 mm, and preferably of from 0.1 μm to 100 μm. The wording "$d_{80}$" is known the skilled artisan and means that 80% by weight of the corresponding particles have a diameter that is smaller than the mentioned value. The particle size of the magnetite can be reduced prior use by grinding or milling. Methods for analyzing the diameter of the magnetic particles or other particles that are used or treated according to the present invention are known to the skilled artisan. Such methods for example include Laser Diffraction Measurement, in particular Laser Diffraction Measurement using a Mastersizer 2000 with software version 5.12G, wherein the sample is dispersed in an aqueous solution of $Na_4P_2O_7$.

In general, the amount of at least one magnetic particle to be applied in the process of the present invention can be determined by a person having ordinary skill in the art in a way that advantageously the whole amount of the at least one valuable matter containing material can be separated by agglomerating with the at least one magnetic particle. In a preferred embodiment of the process according to the present invention, the at least one magnetic particle is added in an amount of from 0.01 to 10% by weight, preferably from 0.1 to 6% by weight, particularly preferably from 0.5 to 4.5% by weight, based on the weight of the dry at least one valuable matter containing material and the at least one second material.

In one preferred embodiment, the magnetic particle is a hydrophobic magnetic particle. In a preferred embodiment, the at least one magnetic particle is hydrophobized on its surface, i.e. is a hydrophobized magnetic particle. In a more preferred embodiment, the at least one magnetic particle has been hydrophobized by treatment with a hydrophobizing agent, wherein preferably the magnetic particle treated with the hydrophobizing agent has a contact angle between the particle surface and water against air of preferably more than 30°, more preferably more than 60°, even more preferably more than 90° and particularly preferably more than 140°.

In general, the hydrophobizing agent may be any agent that will render the surface of the magnetic particle more hydrophobic than the surface of the magnetic particle before the treatment.

In one embodiment, the hydrophobizing agent for hydrophobizing the at least one magnetic particle is a compound of the general formula (III) or derivative thereof $$[(B)_e-(Y)_f]_g \quad (III).$$

wherein each B is independently selected from among linear or branched $C_1$-$C_{30}$-alkyl, $C_1$-$C_{30}$-heteroalkyl, optionally substituted $C_6$-$C_{30}$-aryl, optionally substituted $C_6$-$C_{30}$-heteroalkyl, $C_6$-$C_{30}$-aralky;
and each Y is independently selected as a group by means of which the compound of the general formula (III) binds to the at least one magnetic particle;
each e is the integer 1, 2, 3, 4, 5, 6, 7, 8, 9 or 10;
each f is the integer 1, 2, 3, 4, 5, 6, 7, 8, 9 or 10; and
each g is the integer 1, 2, 3, 4, 5, 6, 7, 8, 9 or 10 to 100.

In a particularly preferred embodiment, B is a linear or branched $C_6$-$C_{18}$-alkyl, preferably linear $C_8$-$C_{12}$-alkyl and very particularly preferably a linear $C_{12}$-alkyl.

In a further particularly preferred embodiment, Y is selected from the group consisting of —$(X)_p$—Si$(R^2)_3$, —$(X)_p$—SiH$(R^2)_2$, —$(X)_p$SiH$_2R^2$ wherein each $R^2$ is independently selected from F, Cl, Br, I or OH; and anionic groups such as

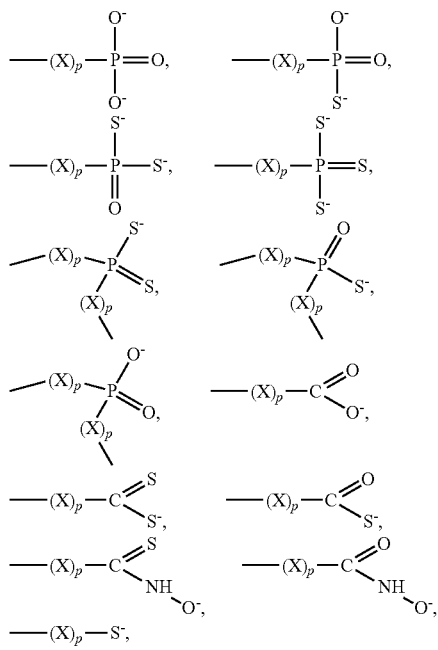

wherein each X is independently O, S, NH, or CH$_2$ and p is 0, 1 or 2.

Very particularly preferred hydrophobizing agents of the general formula (III) are silicon-based oils or siloxanes resulting from in-situ hydrolysis of dodecyl- or other alkyltrichlorosilanes or alkyltrialkoxysilanes; phosphonic acids, for example octylphosphonic acid; carboxylic acids; for example lauric acid, oleic acid or stearic acid; partly polymerized siloxanes (also known as silicon oils), or mixtures thereof.

In a preferred embodiment, the hydrophobizing agent is a compound as disclosed in WO 2012/140065.

Further preferred hydrophobizing agents are mono-, oligo- or polysiloxanes with free OH groups, such as the compounds of formula (IIIa), (IIIb) and (IIIc) or derivatives thereof,

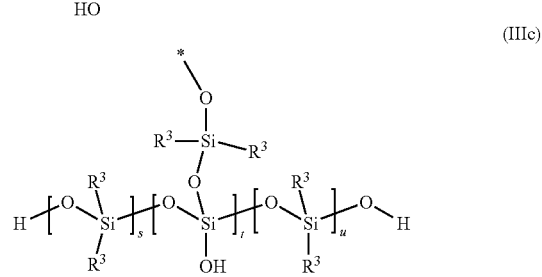

wherein each r, s, t, and u is independently an integer from 1 to 100, and each $R^3$ is independently a straight or branched $C_1$-$C_{12}$ alkyl group.

In formula (IIIc), * denotes a bonding to further moieties comprising —SiOR$_4$ and wherein $R^4$ is selected from hydrogen, linear or branched, optionally substituted $C_1$-$C_{30}$-alkyl, linear or branched, optionally substituted $C_2$-$C_{30}$-alkenyl, linear or branched, optionally substituted $C_2$-$C_{30}$-alkynyl, optionally substituted $C_3$-$C_{20}$-cycloalkyl, optionally substituted $C_3$-$C_{20}$-cycloalkenyl, optionally substituted $C_1$-$C_{20}$-heteroalkyl, optionally substituted $C_5$-$C_{22}$-aryl, optionally substituted $C_6$-$C_{23}$-alkylaryl, optionally substituted $C_6$-$C_{23}$-arylalkyl or optionally substituted $C_5$-$C_{22}$-heteroaryl.

In a preferred embodiment, the hydrophobizing agents of formula (IIIa), (IIIb) or (IIIc) have a molecular weight from about 250 to about 200000 g/mol, preferably from about 250 to about 20000 g/mol and particularly preferably from about 300 to about 5000 g/mol.

According to a preferred embodiment, the hydrophobizing agent is a compound of the general formulas (IV), (IVa), (IVb), (IVc) or derivatives thereof

wherein each $R^5$ is independently selected from hydrogen, linear or branched, optionally substituted $C_1$-$C_{30}$-alkyl, linear or branched, optionally substituted $C_2$-$C_{30}$-alkenyl, linear or branched, optionally substituted $C_2$-$C_{30}$-alkynyl, optionally substituted $C_3$-$C_{20}$-cycloalkyl, optionally substituted $C_3$-$C_{20}$-cycloalkenyl, optionally substituted $C_1$-$C_{20}$-heteroalkyl, optionally substituted $C_5$-$C_{22}$-aryl, optionally substituted $C_6$-$C_{23}$-alkylaryl, optionally substituted $C_6$-$C_{23}$-arylalkyl or optionally substituted $C_5$-$C_{22}$-heteroaryl;

each $R^6$ is independently selected from hydrogen, linear or branched, optionally substituted $C_1$-$C_{30}$-alkyl, linear or branched, optionally substituted $C_2$-$C_{30}$-alkenyl, linear or branched, optionally substituted $C_2$-$C_{30}$-alkynyl, optionally substituted $C_3$-$C_{20}$-cycloalkyl, optionally substituted $C_3$-$C_{20}$-cycloalkenyl, optionally substituted $C_6$-$C_{23}$-heteroalkyl, optionally substituted $C_5$-$C_{22}$-aryl, optionally substituted $C_6$-$C_{23}$-alkylaryl, optionally substituted $C_6$-$C_{23}$-arylalkyl or optionally substituted $C_5$-$C_{22}$-heteroaryl, and the integer r is as described above and v is the integer 1, 2 or 3.

Preference is given to the radicals $R^5$ each being, independently of one another, linear or branched, optionally substituted $C_1$-$C_{30}$-alkyl, particularly preferably $C_1$-$C_{20}$-alkyl, very particularly preferably $C_4$-$C_{12}$-alkyl. In a preferred embodiment, $R^5$ is linear or branched, unsubstituted $C_1$-$C_{30}$-alkyl, particularly preferably $C_1$-$C_{20}$-alkyl or very particularly preferably $C_4$-$C_{12}$-alkyl. Examples of linear or branched $C_4$-$C_{12}$-alkyl radicals are butyl, in particular, n-butyl, isobutyl, tert-butyl; pentyl, in particular n-pentyl, isopentyl, tert-pentyl; hexyl, in particular n-hexyl, isohexyl, tert-hexyl, heptyl; in particular n-heptyl, isoheptyl, tert-heptyl; octyl in particular n-octyl, isooctyl, tert-octyl; nonyl, in particular n-nonyl, isononyl, tert-nonyl, decyl, in particular n-decyl, isodecyl, tert-decyl, undecyl, in particular n-undecyl, isoundecyl, tert-undecyl, or dodecyl, in particular n-dodecyl; isododecyl or tert-dodecyl.

Further preference is given to the radicals $R^5$ each being, independently of one another, linear or branched, optionally substituted $C_2$-$C_{30}$-alkenyl, particularly preferably $C_2$-$C_2$-alkenyl, very particularly preferably or $C_2$-$C_{12}$-alkenyl. Examples of alkenyl radicals which are particularly preferred according to the invention are ethenyl (vinyl), propenyl, in particular n-propenyl, isopropenyl, butenyl, in particular n-butenyl, isobutenyl, tert-butenyl, pentenyl, in particular n-pentenyl, isopentenyl, tert-pentenyl, hexenyl, in particular n-hexenyl, isohexenyl, tert-hexenyl, heptenyl, in particular n-heptenyl, isoheptenyl, tert-heptenyl, octenyl, in particular n-octenyl, isooctenyl, tert-octenyl, nonenyl, in particular n-nonenyl, isononenyl, tert-nonenyl, decenyl, in particular n-decenyl, isodecenyl, tert-decenyl, undecenyl, in particular n-undecenyl, isoundecenyl, tert-undecenyl, or dodecenyl, in particular n-dodecenyl, isododecenyl and tert-dodecenyl.

Further preference is given to the radicals $R^6$ each being, independently of one another, linear or branched, optionally substituted $C_2$-$C_{30}$-alkynyl, particularly preferably $C_2$-$C_{20}$-alkynyl, very particularly preferably $C_2$-$C_{12}$-alkynyl. Examples of alkynyl radicals which are particularly preferred according to the invention are ethynyl, propynyl, in particular n-propynyl, isopropynyl, butynyl, in particular n-butynyl, isobutynyl, tert-butynyl, pentynyl, in particular n-pentynyl, isopentynyl, tert-pentynyl, hexynyl, in particular n-hexynyl, isohexynyl, tert-hexynyl, heptynyl, in particular n-heptynyl, isoheptynyl, tert-heptynyl, octynyl, in particular n-octynyl, isooctynyl, tert-octynyl, nonynyl, in particular n-nonynyl, isononynyl, tert-nonynyl, decynyl, in particular n-decynyl, isodecynyl, tert-decynyl, undecynyl, in particular n-undecynyl, isoundecynyl, tert-undecynyl, or dodecynyl, in particular n-dodecynyl, isododecynyl and tert-dodecynyl.

Further preference is given to the radicals $R^5$ each being, independently of one another, optionally substituted $C_3$-$C_{20}$-cycloalkyl, particularly preferably $C_3$-$C_2$-cycloalkyl, very particularly preferably $C_3$-$C_6$-cycloalkyl, such as cyclopropyl, cyclobutyl, cyclopentyl or cyclohexyl.

Further preference is given to the radicals $R^5$ each being, independently of one another, optionally substituted $C_3$-$C_{20}$-cycloalkenyl, particularly preferably $C_3$-$C_{12}$-cycloalkenyl, very particularly preferably $C_3$-$C_6$-cycloalkenyl such as cyclopropenyl, cyclobutenyl, cyclopentenyl or cyclohexenyl.

Further preference is given to the radicals $R^5$ each being, independently of one another, optionally substituted $C_1$-$C_{20}$-heteroalkyl, particularly preferably $C_1$-$C_{12}$-heteroalkyl. The heteroalkyl radicals present according to the invention are derived from the abovementioned alkyl radicals, with at least one carbon atom being replaced by a heteroatom selected from among N, O, P and S.

Further preference is given to the radicals $R^5$ each being, independently of one another, optionally substituted $C_5$-$C_{22}$-aryl, particularly preferably $C_5$-$C_{12}$-aryl. Examples of aryl radicals which are preferred according to the invention are phenyl, naphthyl or biaryls.

Further preference is given to the radicals $R^5$ each being, independently of one another, optionally substituted $C_6$-$C_{23}$-alkylaryl, particularly preferably $C_6$-$C_{13}$-alkylaryl. An example of an alklaryl radical which is preferred according to the invention is benzyl.

Further preference is given to the radicals $R^6$ each being, independently of one another, optionally substituted $C_6$-$C_{23}$-arylalkyl, particularly preferably $C_6$-$C_{13}$-arylalkyl. Examples of arylalkyl radicals which are preferred according to the invention are tolyl, xylyl, propylbenzyl or hexylbenzyl.

Further preference is given to the radicals $R^5$ each being, independently of one another, optionally substituted $C_2$-$C_{22}$-heteroaryl, particularly preferably $C_5$-$C_{12}$-heteroaryl.

The abovementioned radicals $R^5$ can optionally be substituted. Suitable substituents are, for example, selected from among amino, amido, Imido, hydroxyl, ether, aldehyde, keto, carboxylic acid, thiol, thioether, hydroxamate and carbamate groups. The abovementioned radicals $R^5$ can be mono- or poly-substituted. In the case of multiple substitutions, one substituent group can be present a plurality of times or various functional groups are simultaneously present. The radicals mentioned for $R^5$ can also be monosubstituted or polysubstituted by the abovementioned alkyl, alkenyl, alkynyl, aryl, alkylaryl, arylalkyl, heteroalkyl or heteroaryl radicals.

Very particularly preferred radicals $R^5$ are octyl, in particular n-octyl; hexyl, in particular n-hexyl; and/or butyl, in particular n-butyl; decyl, in particular n-decyl; or dodecyl, in particular n-dodecyl.

Preference is given to the radicals $R^6$ each being, independently of one another, hydrogen, linear or branched, optionally substituted $C_1$-$C_{30}$-alkyl, particularly preferably $C_1$-$C_{20}$-alkyl, very particularly preferably $C_1$-$C_{12}$-alkyl. In a preferred embodiment, $R^6$ is linear or branched, unsubstituted $C_1$-$C_{30}$-alkyl, particularly preferably $C_1$-$C_{20}$-alkyl, or very particularly preferably $C_1$-$C_{12}$-alkyl. Examples of linear or branched $C_1$-$C_{12}$-alkyl radicals are methyl, ethyl, propyl, in particular n-propyl, isopropyl, butyl, in particular n-butyl, isobutyl, tert-butyl, pentyl, in particular n-pentyl, isopentyl, tert-pentyl, hexyl, in particular n-hexyl, isohexyl, tert-hexyl, heptyl, in particular n-heptyl, isoheptyl, tert-heptyl, octyl, in particular n-octyl, isooctyl, tert-octyl, nonyl, in particular n-nonyl, isononyl, tert-nonyl, decyl, in particular n-decyl, isodecyl, tert-decyl, undecyl, in particular n-undecyl, isoundecyl, tert-undecyl, or dodecyl, in particular n-dodecyl, isododecyl or tert-dodecyl.

Further preference is given to the radicals $R^6$ each being, independently of one another, linear or branched, optionally substituted $C_2$-$C_{30}$-alkenyl, particularly preferably $C_2$-$C_{20}$-alkenyl and very particularly preferably $C_2$-$C_{12}$-alkenyl. Examples of alkynyl radicals which are particularly preferred according to the invention are ethenyl (vinyl), propenyl, in particular n-propenyl, isopropenyl, butenyl, in particular n-butenyl, isobutenyl, tert-butenyl, pentenyl, in particular n-pentenyl, isopentenyl, tert-pentenyl, hexenyl, in particular n-hexenyl, isohexenyl, tert-hexenyl, heptenyl, in particular n-heptenyl, isoheptenyl, tert-heptenyl, octenyl, in particular n-octenyl, isooctenyl, tert-octenyl, nonenyl, in particular n-nonenyl, isononenyl, tert-nonenyl, decenyl, in particular n-decenyl, isodecenyl, tert-decenyl, undecenyl, in particular n-undecenyl, isoundecenyl, tert-undecenyl, or dodecenyl, in particular n-dodecenyl, isododecenyl or tert-dodecenyl.

Further preference is given to the radicals $R^6$ each being, independently of one another, linear or branched, optionally substituted $C_2$-$C_{30}$-alkynyl, particularly preferably $C_2$-$C_{20}$-alkynyl or very particularly preferably $C_2$-$C_{12}$-alkynyl. Examples of alkynyl radicals which are particularly preferred according to the invention are ethynyl, propynyl, in particular n-propynyl, isopropynyl, butynyl, in particular n-butynyl, isobutynyl, tert-butynyl, pentynyl, in particular n-pentynyl, isopentynyl, tert-pentynyl, hexynyl, in particular n-hexynyl, isohexynyl, tert-hexynyl, heptynyl, in particular n-heptynyl, isoheptynyl, tert-heptynyl, octynyl, in particular n-octynyl, isooctynyl, tert-octynyl, nonynyl, in particular n-nonynyl, isononynyl, tert-nonynyl, decynyl, in particular n-decynyl, isodecynyl, tert-decynyl, undecynyl, in particular n-undecynyl, isoundecynyl, tert-undecynyl, or dodecynyl, in particular n-dodecynyl, isododecynyl or tert-dodecynyl.

Further preference is given to the radicals $R^6$ each being, Independently of one another, optionally substituted $C_3$-$C_{20}$-cycloalkyl, particularly preferably $C_3$-$C_{12}$-cycloalkyl and particularly preferably $C_3$-$C_6$-cycloalkyl, for example cyclopropyl, cyclobutyl, cyclopentyl or cyclohexyl.

Further preference is given to the radicals $R^6$ each being, independently of one another, optionally substituted $C_3$-$C_{20}$-cycloalkenyl, particularly preferably $C_3$-$C_{12}$-cycloalkenyl and very particularly preferably $C_3$-$C_6$-cycloalkenyl, for example cyclopropenyl, cyclobutenyl, cyclopentenyl or cyclohexenyl.

Further preference is given to the radicals $R^6$ each being, independently of one another, optionally substituted $C_1$-$C_{20}$-heteroalkyl, particularly preferably $C_4$-$C_{12}$-heteroalkyl. The heteroalkyl radicals which are present according to the invention are derived from the abovementioned alkyl radicals, with at least one carbon atom being replaced by a heteroatom selected from among N, O, P and S.

Further preference is given to the radicals $R^6$ each being, independently of one another, optionally substituted $C_5$-$C_{22}$-aryl, particularly preferably $C_5$-$C_{12}$-aryl. Examples of aryl radicals which are preferred according to the invention are phenyl, naphthyl or biaryls.

Further preference is given to the radicals $R^6$ each being, independently of one another, optionally substituted $C_6$-$C_{23}$-alkylaryl, particularly preferably $C_6$-$C_{13}$-alkylaryl. An example of an alkylaryl radical which is preferred according to the invention is benzyl.

Further preference is given to the radicals $R^6$ each being, independently of one another, optionally substituted $C_6$-$C_{23}$-arylalkyl and particularly preferably $C_6$-$C_{13}$-arylalkyl. Examples of arylalkyl radicals which are preferred according to the invention are tolyl, xyyl, propylbenzyl or hexylbenzyl.

Further preference is given to the radicals $R^6$ each being, independently of one another, optionally substituted $C_5$-$C_{22}$-heteroaryl and particularly preferably $C_5$-$C_{12}$-heteroaryl.

The abovementioned radicals $R^6$ may optionally be substituted. Suitable substituents are, for example, selected from among amino, amido, imido, hydroxy, ether, aldehyde, keto, carboxylic acid, thiol, thioether, hydroxamate and carbamate groups. The abovementioned radicals R can be mono- or poly substituted. In the case of multiple substitutions, one substituent can be present a plurality of times or various functional groups are simultaneously present. The radicals mentioned for $R^6$ can also be monosubstituted or polysubstituted by the abovementioned alkyl, alkenyl, alkynyl, aryl, alkylaryl, arylalkyl, heteroalkyl or heteroaryl radicals.

In another preferred embodiment, the at least one hydrophobizing agent is selected from the group consisting of $(NaO)(CH_3)Si(OH)_2$, $(NaO)(C_2H_5)Si(OH)_2$, $(NaO)(C_5H_{11})Si(OH)_2$, $(NaO)(C_8H_{17})Si(OH)_2$, $(KO)(CH_3)Si(OH)_2$, $(KO)(C_2H_5)Si(OH)_2$, $(KO)(C_5H_{11})Si(OH)_2$, $(KO)(C_8H_{17})Si(OH)_2$, $(NH_4O)(CH_3)Si(OH)_2$, $(NH_4O)(C_2H_5)Si(OH)_2$, $(NH_4O)(C_5H_{11})Si(OH)_2$, $(NH_4O)(C_8H_{17})Si(OH)_2$, $(NaO)_2(CH_3)Si(OH)$, $(NaO)_2(C_2H_5)Si(OH)$, $(NaO)_2(C_5H_{11})Si(OH)$, $(NaO)_2(C_8H_{17})Si(OH)$, $(KO)_2(CH_3)Si(OH)$, $(KO)_2(C_2H_5)Si(OH)$, $(KO)_2(C_5H_{11})Si(OH)$, $(KO)_2(C_8H_{17})Si(OH)$, $(NH_4O)_2(CH_3)Si(OH)$, $(NH_4O)_2(C_2H_5)Si(OH)$, $(NH_4O)_2(C_5H_{11})Si(OH)$, $(NH_4O)_2(C_8H_{17})Si(OH)$, $(NaO)_3(CH_3)Si$, $(NaO)_3(C_2H_5)Si$, $(NaO)_3(C_5H_{11})Si$, $(NaO)_3(C_8H_{17})Si$, $(KO)_3(CH_3)Si$, $(KO)_3(C_2H_5)Si$, $(KO)_3(C_5H_{11})Si$, $(KO)_3(C_8H_{17})Si$, $(NH_4O)_3(CH_3)Si$, $(NH_4O)_3(C_2H_5)Si$, $(NH_4O)_3(C_5H_{11})Si$, $(NH_4O)_3(C_8H_{17})Si$, $(NaO)(CH_3)_2Si(OH)$, $(NaO)(C_2H_5)_2Si(OH)$, $(KO)(CH_3)_2Si(OH)$, $(KO)(C_2H_5)_2Si(OH)$, $(NaO)_2(CH_3)_2Si$, $(NaO)_2(C_2H_5)_2Si$, $(KO)_2(CH_3)_2Si$, $(KO)_2(C_2H_5)_2Si$, $Ca^{2+}[(O^-)(CH_3)Si(OH)_2]_2$, $Ca^{2+}[(O^-)(C_2H_5)Si(OH)_2]_2$, $Ca^{2+}[(O^-)(C_5H_{11})Si(OH)_2]_2$, $Ca^{2+}[(O^-)(C_8H_{17})Si(OH)_2]_2$, $Ca^{2+}[(O^-)(CH_3)_2Si(OH)]_2$, $Ca^{2+}[(O^-)(C_2H_5)_2Si(OH)]_2$, $Ca^{2+}[(O^-)_2(CH_3)Si(OH)]$, $Ca^{2+}[(O^-)_2(C_2H_5)Si(OH)]$, $Ca_2+[(O^-)_2(C_5H_{11})Si(OH)]$, $Ca^{2+}[(O^-)_2(C_8H_{17})Si(OH)]$, $Ca^{2+}[(O^-)_2(CH_3)_2Si]$, $Ca^{2+}[(O^-)_2(C_2H_5)_2Si]$ and combinations thereof.

In one embodiment, the at least one hydrophobizing agent is added to the first dispersion I in step (B).

In another preferred embodiment, the at least one magnetic particle has been pre-treated with the at least one hydrophobizing agent before the contacting of dispersion I in step (B).

In one embodiment, the at least one hydrophobizing agent or mixtures thereof may polymerize before or during contacting the magnetic particle.

In another particularly preferred embodiment, the at least one hydrophobizing agent is sodium or potassium methylsiliconate.

In another particularly preferred embodiment, the at least one hydrophobized magnetic particle is a magnetite particle that has been treated with a hydrophobizing agent and preferably with the hydrophoblzing agent sodium or potassium methylsiliconate.

In a preferred embodiment, the at least one hydrophobizing agent is present as a coating on the surface of the magnetic particles in an amount, based on the total weight of the hydrophobized magnetic particle, of from 0.01 to 10% by weight, preferably from 0.1 to 5% by weight.

According to the present invention, the at least one magnetic particle may be predispersed in a dispersion medium. Preferably, the amount of dispersion medium for predispersing the magnetic particles is generally selected so that a slurry or dispersion is obtained which is readily stirrable and/or conveyable. In a preferred embodiment, the slurry or dispersion comprises between 10 and 60% by weight magnetic particles.

According to the invention, the dispersion of the magnetic particles can be produced by all methods known to those skilled in the art. In a preferred embodiment, the magnetic particles to be dispersed and the appropriate amount of dispersion medium or mixture of dispersion media are combined in a suitable reactor, and stirred by means of devices known to those skilled in the art. For example, such a device is a mechanical propeller stirrer. The stirring may occur at a temperature of from about 1 to about 80° C. and preferably at ambient temperature.

Step (B) of the process of the invention may be carried out at a temperature of from 1 to 80° C., preferably from 20 to 40° C. and particularly preferably at ambient temperature.

The contacting according to step (B) of the process according to the present invention may be conducted in any apparatus known to the skilled artisan. For example, the dispersion I and the at least one magnetic particle, optionally together with at least one collector and/or the at least one hydrophobizing agent, are combined and mixed in the appropriate amounts in suitable mixing apparatuses that are known to those skilled in the art, such as mills including ball mills.

In a preferred embodiment, dispersion I in step (B) provides a solid content of from 1 to 60% by weight, preferably from 10 to 60% by weight and particularly preferably from 20 to 45% by weight, based on the whole amount of solids that have to be dispersed.

In another preferred embodiment, the at least one valuable matter containing material and the at least one second material is comminuted, for example by milling as described above, to particles having a particles size of from about 100 nm to about 400 μm in or before step (B).

According to the present invention, the amount of dispersion medium I in step (A) and/or step (B) can generally be selected so that a dispersion I is obtained which is readily stirrable and/or conveyable.

After performing step (B) of the process according to the present invention, a mixture may be obtained that comprises the further components of the mixture and agglomerates of the at least valuable matter containing material and the at least one magnetic particle, wherein at least one collector and/or hydrophobizing agent is at least partly located between the at least one valuable matter containing material and the at least one magnetic particle.

In a preferred embodiment, the amount of dispersion medium that needs to be present in step (B) of the process according to the present invention is determined so that a dispersion is introduced into step (C) which has a solid content of from 1 to 80% by weight, preferably from 5 to 40% by weight and particularly preferred 10 to 30% by weight of the dispersion, wherein in each case the solid content is based on the whole amount of solids present in the dispersion.

Step (C):

Step (C) of the process according to the present invention comprises the separation of a magnetic fraction I comprising the at least one magnetic particle and the at least one valuable matter containing material agglomerate from the dispersion obtained in step (B) by application of a magnetic field. The magnetic separation may be conducted by any method known to the skilled artisan. In general, methods for separating magnetic parts as a magnetic fraction from a mixture comprising them and non-magnetic parts as the remaining non-magnetic fraction are known to the skilled artisan.

In a preferred embodiment, step (C) may be carried out with any magnetic equipment that is suitable to separate magnetic particles from dispersion, e.g. drum separators, high or low intensity magnetic separators, continuous belt type separators or others.

In another preferred embodiment, step (C) may be carried out by introducing a permanent magnet into the reactor in which the dispersion of step (B) is present. In a preferred embodiment, a dividing wall composed of non-magnetic material, for example the wall of the reactor, may be present between the permanent magnet and the mixture to be treated. In a further preferred embodiment of the process of the invention, an electromagnet is used in step (C) which is only magnetic when an electric current flows. Suitable apparatuses are known to those skilled in the art.

For example, suitable apparatus and methods of magnetic separation may be found in "Magnetic techniques for the treatment of materials", Jan Svoboda, Kluwer Academic Publishers, 2004.

In a preferred embodiment, the magnetic separation equipment allows washing the magnetic concentrate during separation with a dispersant, preferably water. The washing preferably allows removing inert material from the magnetic concentrate.

In a preferred embodiment, step (C) is conducted continuously or semi-continuously, wherein preferably the dispersion to be treated flows through a separator. Flow velocities of the dispersion to be treated are in general adjusted to obtain an advantageous yield of separated magnetic agglomerates. In a preferred embodiment, flow velocities of the dispersion to be treated are 10 mm/s to 1000 mm/s.

The pH-value of the dispersion which is treated in step (C) may in general be from about 5 to about 13 and preferably from about 7 to about 12. In a preferred embodiment, no adjustment of the pH-value of the dispersion obtained in step (B) is necessary.

Step (C) of the process of the invention may be carried out at any suitable temperature. In a preferred embodiment, step (C) is carried out at a temperature from about 10 to about 60° C. and preferably at ambient temperature.

In a preferred embodiment, step (C) is performed in a continuous or semi-continuous process wherein the dispersion is preferably mixed by turbulent flow, and is more preferably not additionally stirred.

In a preferred embodiment, the apparatus used for the magnetic separation according to step (C) of the present invention is an apparatus as disclosed in WO 2012/104292.

In another preferred embodiment, the apparatus used for the magnetic separation according to step (C) of the present invention is an apparatus as disclosed in WO 2011/131411, WO 2011/134710, WO 2011/154178, DE 10 2010 023 130, DE 20 2011 104 707, WO 2011/107353, DE 10 2010 061 952, WO 2012/116909, WO 2012/107274 or WO 2013/167634.

As one preferred apparatus for the magnetic separation, the apparatus comprises at least one loop-like canal through which the dispersion flows.

In a preferred embodiment, the apparatus used in step (C) of the process according to the present invention for the magnetic separation comprises at least one loop-like canal through which the dispersion flows and which has at least two inlet and at least two outlets.

In one embodiment, the apparatus that is preferably used in step (C) of the process according to the present invention further comprises at least one magnet that is movable alongside the canal.

In one embodiment, the apparatus for the magnetic separation of the invention is operated in countercurrent.

The magnets used according to the invention can be any magnets known to those skilled in the art, for example permanent magnets, electromagnets and combinations thereof. Permanent magnets are preferred, because the amount of energy that is consumed by the apparatus according to the invention may be essentially decreased compared to the use of electro magnets.

In a preferred embodiment, a multiplicity of magnets is arranged around the loop-like canal. In a preferred embodiment, the magnetic constituents present in the dispersion accumulate at least in part, preferably in their entirety, i.e. in a proportion of at least 60% by weight, preferably at least 90% by weight, particularly preferably at least 99% by weight, on the side of the loop-like canal facing the at least one magnet as a result of the magnetic field, wherein the % by weight is based on the total weight of magnetic constituents.

In step (C) of the process according to the present invention, the first magnetic fraction I comprising the at least one magnetic particle and the at least one valuable matter containing material is preferably separated from the at least one second material.

In a preferred embodiment, the magnetic fraction I, which is obtained after applying a magnetic field and which preferably comprises the at least one magnetic particle and the at least one valuable matter containing material, has a first grade of the at least one valuable matter. A person skilled in the art knows that, in order to determine the grade of the at least one valuable matter containing material, the skilled person needs to isolate the valuable matter containing material, e.g. by separating the at least one valuable matter containing material from the at least one magnetic particle by commonly used methods, or, for example, using a method according to optional steps (F) and (G) of the process of the present application. The grade may then for example be determined by X-ray fluorescence, fire assay and/or inductively coupled plasma mass-spectroscopy (ICP_MS).

In a preferred embodiment, the magnetic fraction I that is separated in step (C) of the process according to the present invention provides a grade of the at least one valuable matter containing material of 0.000001 to 80% valuable matter by weight, wherein the weight is based on the valuable matter present in the valuable matter containing material and undesired non-magnetic constituents like the at least one second material as mentioned above.

In one embodiment, the grade of the at least one valuable matter containing material in fraction I is less than 10% valuable matter by weight, less than 1% valuable matter by weight, less than 0.1% valuable matter by weight or less than 0.01% valuable matter by weight.

The magnetic fraction I may still comprise significant amounts of undesired compounds, such as Cr-containing compounds. In one embodiment, the magnetic fraction I comprises valuable matter containing material and more than about 10% by weight Cr, more than about 15% by weight Cr, more than about 20% or more than about 25% by weight Cr.

Step (D):

Step (D) of the process according to the present invention comprises the redispersing of the magnetic fraction I, which comprises at least one magnetic agglomerate of at least one magnetic particle and at least one valuable matter containing material obtained in step (C), in at least one dispersion medium II to obtain a dispersion II.

According to the present invention, step (D) of the process according to the present invention is preferably conducted in order to increase the ratio of at least one valuable matter containing material to the at least one undesired material and thus to decrease the amount of undesired non-magnetic constituents such as the at least one second material present in the magnetic fraction I obtained in step (C).

In principle, redispersing according to step (D) of the process according to the present invention can be conducted by any method known to the skilled artisan. In principle, any dispersion medium as mentioned above may be used as dispersion medium II.

In a preferred embodiment, step (D) of the process according to the present invention allows entrapped gangue to be released from the cavities between magnetic agglomerates, wherein the gangue preferably comprises the at least one second material that has not been removed in step (C).

The amount of at least one dispersion medium II that is used in step (D) can depend on the amount of dispersion medium which is still present in the at least one magnetic fraction I obtained in step (C).

Preferably, in step (D) of the process according to the present invention, at least one dispersion medium II is added in an amount that a dispersion is obtained having a solid content of from 0.1 to 50% by weight, preferably from 1 to 30% by weight and more preferably from 5 to 20% by weight, in each based on the weight of the whole dispersion that is obtained.

In another preferred embodiment, the dispersion medium II in step (D) is water.

Further, the dispersion II that is obtained in step (D) is preferably agitated to improve the dispersion of at least one magnetic agglomerate and undesired second material such as the at least one second material that is still present shall be removed.

Agitation, for example stirring, shaking, pumping or application of ultrasound etc., can be accomplished by any methods and apparatuses known to the skilled artisan, for example using stirring vessels, tanks, stator or tube mixers. The agitation should preferably be conducted in such a way that at least part of the agglomerates of the valuable matter containing material and the at least one magnetic particle are not partly deagglomerated or destroyed by the agitation.

In a preferred embodiment, the dispersion II is stirred in step (D) of the process according to the present invention so that the speed of stirring is adjusted in a way that preferably no sedimentation occurs. The skilled artisan knows how to handle this.

After step (D) of the process according to the present invention, a dispersion may be obtained comprising the desired at least one magnetic agglomerate and undesired non-magnetic constituents, such as the at least one second material, that have not been removed in step (C).

It has surprisingly been found that according to the present invention the quality of the at least one magnetic agglomerate in respect of its grade can significantly be improved by step (D). The at least one magnetic agglomerate can therefore be separated off in the following step (E).

According to a preferred embodiment of the process according to the present invention, step (D) is conducted once. According to another preferred embodiment of the process according to the present invention, step (D) may be conducted more than once, for example twice, three times or four times. In this case, the dispersion medium is preferably changed or at least partly replaced after each redispersing cycle and the magnetic fraction I is isolated each time and redispersed in each subsequent repetition.

Step (E):

Step (E) of the process according to the present invention comprises the separation of the at least one magnetic fraction II from dispersion II, wherein the magnetic fraction II comprises at least one magnetic particle and at least one valuable matter containing material.

In a preferred embodiment, the valuable matter containing material of magnetic fraction II has a second grade of valuable matter which is more preferably higher than a first grade of valuable matter of the valuable matter containing material of the magnetic fraction I obtained in step (C).

In a preferred embodiment, the valuable matter containing material of magnetic fraction II has a second grade of valuable matter which is at least twice or more preferably at least 4 times higher than the first grade of the valuable matter containing material of magnetic fraction I obtained in step (C).

In another preferred embodiment, the ratio of the second grade to the first grade is at least 1.2, at least 1.5, at least 2.0 or at least 4.0.

In general, the separation in step (E) of the process according to the present invention may be conducted by any methods known to the skilled artisan.

Preferably, the separation in step (E) of the process according to the present invention is conducted by application of a magnetic field, flotation, dense media separation, gravity separation, spiral concentrator or combinations thereof.

In a preferred embodiment, the separation in step (E) of the process according to the present invention is conducted by application of a magnetic field.

As already outlined in respect of step (C), in general, any method known to the skilled artisan for the separation using a magnetic field can be used. Most preferably, step (E) of the process according to the present invention may be conducted using the method and the apparatus as mentioned in respect of step (C), which is disclosed in WO 2012/104292.

After step (E) of the process according to the present invention, the second magnetic fraction II comprises at least one magnetic agglomerate comprising the desired at least one valuable matter containing material having a high grade of valuable matter. Further, this magnetic fraction II obtained after step (E) may have an advantageous low content of toxic or hazardous components such as chromium or minerals thereof. In addition, the lower chromium content may give rise to less energy consumption in possible subsequent smelting steps of the valuable recovery process.

According to a preferred embodiment of the process according to the present invention, the dispersion II that is obtained after separation of the at least one second magnetic fraction II in step (E), which preferably contains dispersion medium, low amounts of magnetic particles or agglomerates and at least one second material, is recycled as the dispersion I into step (A) and/or (B).

The dispersion II obtained after performing step (E) may comprise incompletely separated magnetic agglomerates, undesired at least one second material and a dispersion medium, such as water. A preferred embodiment in which this dispersion is recycled into step (A) and/or (B) is therefore particularly advantageous, because the separation efficiency of the process can further be improved and the loss of desired valuable matter containing material may be further decreased.

According to a further preferred embodiment of the process according to the present invention, steps (C), (D) and (E) of the process according to the present invention are conducted more than once, for example twice, three times, four times etc. In this case, the process according to the present invention comprises the following steps. (A), optionally (B), (C), (D), (E), (C), (D), (E), optionally (F), optionally (G), optionally (H) or (A), optionally (B), (C), (D), (E), (C), (D), (E), (C), (D), (E), optionally (F), optionally (G), optionally (H) etc. According to this preferred embodiment in which steps (C), (D) and (E) are repeated twice or more than twice, the at least one magnetic agglomerate is recycled into step (C) again.

Optional Step (F):

In one embodiment of the process according to the present invention, step (F) is conducted after step (E), wherein step (F) comprises redispersing the at least one magnetic fraction II in dispersion medium III to obtain a dispersion III. Preferably, the magnetic particles are separated or "cleaved" from the at least one valuable matter containing material.

In a preferred embodiment, dispersion medium III comprises at least one of organic solvents, basic compounds, acidic compounds, oxidants, reducing agents, surfactants or mixtures thereof.

Examples of basic compounds which can be used according to the Invention are aqueous solutions of basic compounds, for example aqueous solutions of alkali metal and/or alkaline earth metal hydroxides, such as KOH or NaOH; lime water, aqueous ammonia solutions, aqueous solutions of organic amines of the general formula $(R^7)_4N^+$, where each $R^7$ is selected independently from $C_1$-$C_8$-alkyl which may optionally be substituted.

Examples of surfactants which can be used according to the invention are nonionic, anionic, cationic and/or zwitterionic surfactants. In a preferred embodiment, the cleavage is made by the use of preferably biodegradable and/or nonionic surfactants in concentrations in the range of the critical micelle concentrations.

In a preferred embodiment, the addition product of the at least one valuable matter containing material and magnetic particle is cleaved by means of preferably biodegradable nonionic surfactants added in an amount of from 0.001 to 10% by weight, preferably from 0.01 to 1% by weight, based on the weight of the total liquid phase of suspension. The surfactant concentration is preferably at least more than its critical micelle concentration (CMC), more preferably at least twice as high as its CMC.

In a preferred embodiment, the dispersion III comprises a mixture of water and surfactant.

Optional Step (G):

According to a preferred embodiment of the process according to the present invention, the following optional step (G) is conducted after optional step (F):

(G) separation of dispersion III into a third magnetic fraction III and a non-magnetic fraction and isolating the at least one valuable matter containing material from the non-magnetic fraction.

Optional step (G) is conducted if the at least one valuable matter containing material shall be isolated, i.e. without at least one magnetic particle present. In general, the same information in respect of methods and apparatuses as already mentioned in respect of step (C) of the process according to the present invention apply to optional step (G).

Optional step (H):

According to a preferred embodiment of the process according to the present invention, the following optional step (H) may be conducted after step (E) or step (G):

(H) processing of the at least one magnetic fraction II obtained in step (E), the non-magnetic fraction obtained in step (G) and/or the isolated at least one valuable matter containing material obtained in step (G) by smelting, extracting and/or wet chemical refining.

The magnetic fraction II obtained in step (E) preferably comprises iron comprising magnetic substances or magnetic particles in addition to at least one valuable matter containing material.

Since iron is essentially necessary for melting and/or smelting processes to obtain the at least one valuable matter in pure or enriched form, the magnetic agglomerates that are obtained in step (E) of the process according to the present invention can directly be treated in a smelting and/or melting process.

In the case that noble metals are the valuable matter of the valuable matter comprising material in combination with iron comprising magnetic particles as the at least one magnetic particle, no need for further addition of other iron containing compounds may be necessary. Instead, the magnetic iron oxide particles loaded with noble metal containing material are added to the furnace feed in place of iron oxide otherwise added to the process.

Smelting, extracting and/or wet chemical refining are conducted according to methods that are known to the skilled artisan.

The process according to the present invention allows that optional step (H) can be conducted more efficiently, for example with lower energy costs in step (H), because the grade of the at least one valuable matter containing material of magnetic fraction II in step (E) is increased and thus, the amount of material to be treated in the subsequent steps of the valuable recovery process is decreased. In addition, the capacity of the whole process may be increased.

Definitions

As used herein, the term "valuable matter" refers to any material that may be of commercial value. Examples of valuable matter include, but are not limited to, elemental metals such as Ag, Au, Pt, Pd, Rh, Ru, Ir, Os, Cu, Mo, Ni, Mn, Zn, Pb, Te, Sn, Hg, Re, V, Fe or mixtures thereof. In a preferred embodiment, the valuable matter includes PGMs, Au, Ag, Cu, Mo, rare earths and the like. A "valuable matter containing material" refers a material that contains such a valuable matter in any form, such as in ore minerals, metals in pure form, alloys or mixtures thereof. For example, a valuable matter containing material may be an ore mineral comprising the valuable matter Pt.

As used herein, the term "dispersion" refers to material comprising more than one phase wherein at least one of the phases consists of finely divided phase domains, often in the cololdal size range, dispersed throughout a continuous phase.

For the purposes of the present invention, "hydrophobic" as in "hydrophobic particle" means that the corresponding particle can be hydrophobic by itself or can subsequently be hydrophobized by treatment with at least one surface-modifying substance. It is also possible for a particle which is hydrophobic per se to be additionally hydrophobized by treatment with at least one surface-modifying substance. Examples of surface-modifying substances include, but are not limited to, a hydrophobizing agent and a collector. Within the scope of the present invention, the term "hydrophobic" also includes that a "hydrophobized substance" such as a "hydrophobized magnetic particle" or a valuable matter containing material treated with a collector has a contact angle between water and the optionally hydrophobized surface of a particle against air of $\geq 90°$.

In the scope of the present invention, "hydrophilic" means that a corresponding solid "hydrophilic particle" has a contact angle of water against air of $<90°$.

Methods to determine the contact angle are well known to the skilled artisan. For example, for the determination of the contact angel against water may be determined by optical drop shape analysis, e.g. using a DSA 100 contact angle measuring device of Krüsse (Hamburg, Germany) with the respective software. Typically 5 to 10 independent measurements are performed in order to determine a reliable average contact angle.

As used herein, the term "derivative" such as in "a compound of formula (I) or derivatives thereof" preferably refers to salts, the protonated form or the deprotonated form of said compounds. Preferred salts as derivatives of a compound wherein the compound represents the anionic part of the salt include salts wherein the respective one or more cation of the salt is sodium, potassium, calcium, magnesium or $N(R^1)_4^+$, wherein $R^1$ is an unsubstituted or substituted $C_1$-$C_{12}$-alkyl. Preferred salts as derivatives of a compound wherein the compound is the cation include salts wherein the respective one or more anion of the salt is Cl, Br, I, F, carbonate, phosphate, sulphate, sulphide or hydroxide and the like. The person skilled in the art is aware that the protonated and/or deprotonated form of a compound may depend on the pH in a dispersion.

As used herein, the term "optionally substituted" refers to a group that is either unsubstituted or substituted, e.g. with 1, 2, 3, 4 or 5 substituents. Preferred substituents are F, Cl, Br, I, OH, SH, —COOH, —$NH_2$, —CN, —C(O)$NH_2$ (amido), —C(O)NHC(O)—$C_1$-$C_{30}$-alkyl (imido), —O—$C_1$-$C_{30}$-alkyl (ether), —C(O)—$C_1$-$C_{30}$-alkyl, (=O), —S—$C_1$-$C_{30}$-alkylthioether, —C(O)NHOH (hydroxamate) or —N($R_1$)C(O)OH (carbamate).

As used herein, the term "$C_1$-$C_{30}$-alkyl" refers to linear or branched hydrocarbons having 1 to 30 carbon atoms. Non-limiting example of $C_1$-$C_{30}$ alkyl include, but are not limited to methyl, ethyl, propyl, isopropyl, n-butyl, isobutyl, tert-butyl, pentyl, in particular n-pentyl, isopentyl, tert-pentyl, n-hexyl, isohexyl, tert-hexyl, n-heptyl, isoheptyl, tert-heptyl, n-octyl, isooctyl, tert-octyl, nonyl, n-nonyl, isononyl, tert-nonyl, n-decyl, isodecyl, tert-decyl, undecyl, n-undecyl, isoundecyl, tert-undecyl, or dodecyl, n-dodecyl, isododecyl or tert-dodecyl.

As used herein, the term "$C_2$-$C_{30}$-alkenyl" refers to linear or branched hydrocarbons having 2 to 30 carbon atoms and at least one C—C double bond. Examples of alkenyl which are particularly preferred according to the invention are ethenyl (vinyl), propenyl, in particular n-propenyl, isopropenyl, butenyl, n-butenyl, isobutenyl, tert-butenyl, pentenyl, in particular n-pentenyl, isopentenyl, tert-pentenyl, hexenyl, in particular n-hexenyl, Isohexenyl, tert-hexenyl, heptenyl, in particular n-heptenyl, isoheptenyl, tert-heptenyl, octenyl, in particular n-octenyl, isooctenyl, tert-octenyl, nonenyl, in particular n-nonenyl, isononenyl, tert-nonenyl, decenyl, in particular n-decenyl, isodecenyl, tert-decenyl, undecenyl, in particular n-undecenyl, isoundecenyl, tert-undecenyl, or dodecenyl, in particular n-dodecenyl, isododecenyl or tert-dodecenyl.

As used herein, the term "$C_1$-$C_{30}$-heteroalkyl" refers to linear or branched hydrocarbons having 1 to 30 carbon atoms and at least one heteroatom selected form the group consisting of N, O, P and S. The at least one heteroatom may be either the point of attachment, such as in -Het-$CH_2$—, part of the chain, such as in —CH$_2$—Het-CH$_2$—, or the heteroatom may be terminal, such as in —CH$_2$—Het, wherein "Het" denotes the heteroatom. In case the heteroatom is terminal, the free valences may be occupied by hydrogen or a C$_1$-C$_{30}$-alkyl group.

As used herein, the term "C$_6$-C$_{30}$-aryl" refers to aromatic carbocyclic rings of 6 to 30 ring members, including both mono, bi-, and tri-cyclic ring systems. Non-limiting examples of C$_6$-C$_{30}$-aryl include -indenyl, -phenyl, -naphthyl-, acenaphthyl-antranyl, -phenanthryl and the like.

As used herein, the term "C$_6$-C$_{30}$-cycloalkyl" refers to mono-, bi- or tricyclic saturated hydrocarbons having from 6 to 30 carbon atoms. Representative C$_6$-C$_{30}$-cycloalkyl include cyclohexyl, cecloheptyl, cyclooctyl, cyclononyl, cyclodecyl, cycloundecyl and cyclododecyl.

As used herein, the term "C$_6$-C$_{30}$ heterocycloalkyl" refers to a 6 to 30-membered mono-, bi- or tricyclic heterocyclic ring which is either saturated, unsaturated, non-aromatic or aromatic. The heteroatom in the heterocycloalkyl may be selected from O, S, P and N, wherein the nitrogen may be quarternized and the S may also be present in form of S(O) or S(O)$_2$.

As used herein, the term "C$_6$-C$_{30}$-aralkyl" refers to aromatic mono-, bi or tricyclic rings that are substituted with 1, 2, 3, 4 or 5 alkyl groups. Examples of C$_6$-C$_{30}$-arylalkyl include tolyl, xylyl, propylbenzyl and hexylbenzyl.

As used herein, the term "collector" refers to a compound that selectively forms a hydrophobic layer on a given valuable matter containing material such as a mineral surface. Collectors are typically known for their use in flotation processes. A collector may be an ionizing collector, such as a cationic collector or an anionic collector; or a non-ionizing collector. The term "ionizing" as used in "ionizing collector" refers to a collector that dissociates in water in at least two groups, such as in a cation and an anion. The term "anionic collectors" refers to collectors wherein the anionic part forms the hydrophobic layer on a given mineral. The term "cationic collector" refers to a collector wherein the cationic part forms a hydrophobic layer on a given mineral surface. The term "non-ionizing collector" refers to collectors which are usually liquid, non-polar hydrocarbons that do not dissociate in water.

Examples of anionic collectors include, but are not limited to, oxyhydryl collectors such as carboxylates, alkyl sulfates, sulfonates, hydroxamates, sulfosuccinates and sulfosuccinamates, phosphonic acid derivatives, phosphoric acid ester, sulfhydryls, sulfur and nitrogen derivatives of carbonic acids, preferably xanthates, dithiophosphinates, trithiocarbonates and substituted mercaptobenzothiozoles and dithiophosphates.

Examples of cationic collectors include, but are not limited to, compounds comprising at least one primary, secondary, tertiary or quaternary amine such as fatty amines or ether amines.

Examples of non-ionizing collectors include, but are not limited to, kerosene, transformer oils and synthetic hydrocarbon oils.

Further, collectors may also have a polymeric structure such as the polymers described in WO 2013/038192 A1.

Non-limiting examples of collectors are also found in the collector handbook of floating agents: chemistry, theory and practice, Srdjan M. Balutovic, February 2008, Elsevier.

As used herein, the term "grade" refers to a valuable matter content present in a valuable matter containing material. A valuable matter containing material present in the magnetic agglomerates with at least one magnetic particle may also have a grade of valuable matter which may be determined after deagglomeration and magnetic separation from the respective magnetic particles. As used herein, the grade is % by weight or ppm by weight of a valuable matter of an isolated dry solid. Methods to determine the grade of a valuable matter containing material are commonly known to the skilled person. For example, the grade may be determined by X-ray fluorescence, fire assay and/or inductive coupled plasma mass spectrometry.

As used herein, the term "rare earth metal" refers to one of a set of seventeen chemical elements in the periodic table, namely the fifteen lanthanides plus scandium and yttrium.

As used herein, the term "ore" refers to a type of rock that contains valuable matter such as valuable metal that can be extracted from the rock. The ores may be extracted through mining. The ore may contain a desired material, such as an ore mineral, and also an undesired second material such as gangue.

As used herein, the term "mineral" or "ore mineral" refers to a naturally occurring substance that is solid inorganic and representable by a chemical formula, which is usually abiogenic and may have an ordered atomic structure. An ore mineral may carry a valuable matter. The ore mineral is different from a rock, which can be an aggregate of minerals and/or non-minerals. Examples of minerals include, but are not limited to, sulfides, oxides, halides, carbonates, sulfates, and phosphates of valuable metals.

As used herein, the term "slag" or "artificially prepared slag" or "metallurgical slag" refers to the by-product of a smelting process.

The main use of a smelting process is to convert an ore, scrap or a material mixture containing different metals into a form from which the desired metals can be skimmed as a metal layer and the undesired metal oxides, e.g. silicates, alumina, etc., remain as the slag. During smelting, a silicate-rich liquid phase may separate from the heavier metal melt. The latter is flowing through dedicated openings in the melting vessel and is further processed. The phase separation is however not complete, but a fraction of the desired metal becomes trapped in the liquid slag phase and remains dispersed there after solidification resulting in a so-called "mixing layer".

In general, one can distinguish between oxidative and reductive smelter operation. The slag material that can be separated according to the present invention can either be obtained under reductive conditions or can be obtained under oxidative conditions. For example, slag produced in PGM recovery operations, for example in Pt mines or old catalyst reprocessing etc., is usually formed under reducing conditions, which are exemplarily explained in the following. The energy needed to heat the mass to beyond the melting point is in general provided by an external heating, e.g. gas burners, or an electric arc. Often, carbon or other reducing materials are added. The goal is to reduce noble metal compounds to metal state. Reduced metals and the oxidic phase are immiscible and demix. Slags produced under reductive conditions often contain residual PGMs as free metals or alloys with other transition metals, particularly iron. These alloys are often ferromagnetic and can be separated from the slag matrix by a magnetic field after liberation. The losses of PGM into slag are almost exclusively due to incomplete demixing of the liquid metal and liquid slag phases—no significant formation of PGM solid solution in the slag occurs.

In a smelter that is operated under reductive conditions, the most base metal sulphides remain as sulphides. Some metal species, e.g. PGMs, may also remain as the native metal or tend to migrate into the magnetic fraction. Magnetite is often fed into the smelter to support the formation of the slag. Platinum and also rhodium preferably feature this behaviour to migrate to the magnetic fraction thus after the smelting process these precious group metals are hidden in the magnetic fraction, which is preferably in the slag, as dopants.

Is a smelter operated under oxidative conditions, the base metals sulphides and also some native metals compounds are oxidized. In this case, the magnetic separation process according to the present invention is rarely used without pre-treatment. However, if a surface treatment, for example a selective sulphidization of the desired metal of value, is preferably executed, the magnetic separation process according to the present invention can be employed as described herein. Besides the preferred sulphidization, also other surface treatments can be used to convert the desired metal species into a sulphidic, native or magnetic form. These treatments are known to the skilled artisan.

As used herein, the term "ore-bearing slag" refers to slag that comprises ores, i.e. slag that inter alia comprises a valuable matter containing material such as an ore mineral. The ore-bearing slag may also comprise at least one second material such as gangue.

As used herein, the term "wet ore tailing" refers to a dispersion comprising ore as a "tailing", i.e. as the undesired fractions left over after the process of separating the valuable fraction from the uneconomic fraction of an ore. However, such tailings may still comprise at least one valuable matter containing material but also at least one second material.

As used herein, the term "canal" describes the body structure of an apparatus. According to the present invention the wording "canal" describes an apparatus, which is, in its easiest embodiment, formed by a tube, e.g. the canal according to the invention has a length that is larger than the breadth or diameter of the canal. The cross-section of the canal can have any suitable shape, for example oval, annular, circular, square, rectangular, irregular or a combination of these shapes, preferably square or rectangular.

As used herein, the term "loop-like" describes a canal, which, in a simple embodiment, is formed like a loop. In a preferred embodiment the loop-like canal forms a part of a circular arc, for example at least 90°, preferably at least 120°, more preferably at least 180°, in particular at least 270°, of a circular arc.

As used herein, the term "semimetal" refers to semimetals or "metalloids" In general which are known to the skilled artisan. The term "semimetal" includes boron, silicon, germanium, arsenic, antimony, tellurium, carbon, aluminium, selenium, polonium and astatine. Preferably, the semimetal is selected from the group consisting of boron, silicon, germanium, arsenic, antimony and tellurium.

As used herein, the term "complex oxide matrices" refers to a mixed metal oxide such as binary or higher-level oxides of the respective metals. Examples of complex oxide matrices include, but are not limited to, Ti—Si oxides, Si—Cr oxides, Si—Zr oxides and the like.

As used herein, the term "selectively" means that the partition coefficient of the surface-modifying substance between the surface of a first material and the surface of an at least one second material is generally >1, preferably >100, particularly preferably >10 000. For example, if the surface-modifying substance is a collector, it preferentially binds to the surface of the at least one valuable matter containing material (first material) compared to the surface of the at least one second material. In an alternative example, the hydrophobizing agent preferentially binds to the surface of the magnetic particle (first material) compared to the surface of the at least one second material.

The present invention also relates to the following items:

(1) A process for the separation of at least one valuable matter containing material from a dispersion comprising said at least one valuable matter containing material and at least one second material, wherein the process comprises the following steps:
(A) providing a first dispersion I comprising a dispersion medium I, the at least one valuable matter containing material and the at least one second material;
(B) contacting dispersion I of step (A) with at least one magnetic particle;
(C) separating a first magnetic fraction I from dispersion I by applying a magnetic field, wherein the magnetic fraction I comprises the at least one magnetic particle and the at least one valuable matter containing material;
(D) redispersing the magnetic fraction I in at least one dispersion medium II to obtain a dispersion II; and
(E) separating a second magnetic fraction II from dispersion II, wherein the magnetic fraction II comprises at least one magnetic particle and at least one valuable matter containing material.

(2) The process according to item (1), wherein the separation of magnetic fraction II from dispersion II in step (E) is conducted by applying a magnetic field, flotation, dense media separation, gravity separation, spiral concentrator and combinations thereof and preferably by applying a magnetic field.

(3) The process according to items (1) or (2), wherein the valuable matter containing material of the magnetic fraction I in step (C) has a first grade of at least one valuable matter and wherein the valuable matter containing material of the magnetic fraction II in step (E) has a second grade of the at least one valuable matter.

(4) The process according to any one of items (1) to (3), wherein the second grade of the at least one valuable matter obtained in step (E) is higher than the first grade of the at least one valuable matter obtained in step (C).

(5) The process according to item (4), wherein the ratio of second grade to the first grade of the at least one valuable matter is at least 1.2, at least 1.5, at least 2.0 or at least 4.0.

(6) The process according to any one of items (1) to (5), wherein the at least one valuable matter containing material has been pre-treated with at least one collector or wherein at least one collector is added in step (A) or (B).

(7) The process of items (6), wherein the at least one collector is an ionizing collector or a non-ionizing collector.

(8) The process of item (7), wherein the at least one collector is a compound of formula (I) or derivative thereof $$[(A)_m(Z)_n]_o \qquad (I)$$

and wherein each A is independently selected from $C_1$-$C_{30}$-alkyl, $C_2$-$C_{30}$-alkenyl $C_1$-$C_{30}$-heteroalkyl, $C_6$-$C_{30}$-aryl, $C_6$-$C_{30}$-cycloalkyl, $C_6$-$C_{30}$-heteroalkyl, $C_6$-$C_{30}$-heterocycloalkyl, $C_6$-$C_{30}$-aralkyl, each of which may be unsubstituted or optionally substituted;

each Z is independently selected from anionic groups, cationic groups or non-ionic groups;

m is an integer of 1, 2, 3, 4, 5, 6, 7, 8, 9 or 10;

n is an integer of 1, 2, 3, 4, 5, 6, 7, 8, 9 or 10; and o is an integer of 1, 2, 3, 4, 5, 6, 7, 8, 9 or 10 to 100.

(9) The process according to item (8), wherein Z is selected from:

a)

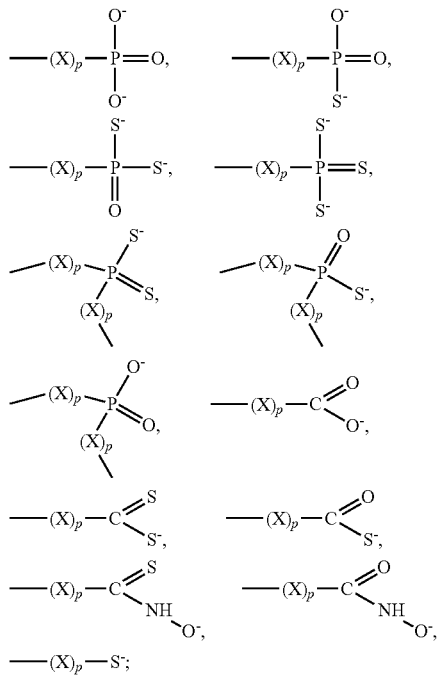

b)

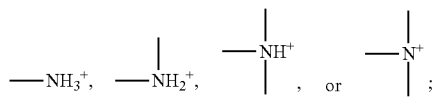

c)

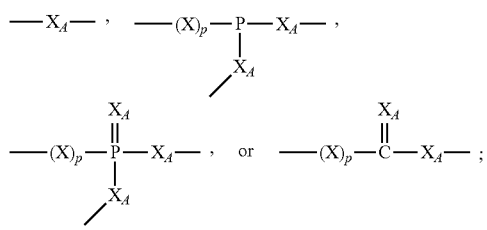

wherein each X is independently selected from the group consisting of O, S, NH, $CH_2$ and each p is independently selected from the integer 0, 1 or 2 and each $X_A$ is independently selected from O or S.

(10) The process according to any one of items (6) to (9), wherein the at least one collector is selected from:

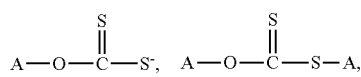

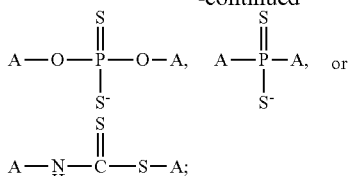

or a derivative thereof.

(11) The process according to any one of items (1) to (10), wherein the at least one valuable matter is selected from the group consisting of Ag, Au, Pt, Pd, Rh, Ru, Ir, Os, Cu, Mo, Ni, Mn, Zn, Pb, Te, Sn, Hg, Re, V, Fe; or combinations or alloys thereof.

(12) The process according to any one of items (1) to (11), wherein the at least one valuable matter is Ru, Rh, Pd, Os, Ir, Pt or combinations or alloys thereof.

(13) The process according to any one of items (1) to (12), wherein the at least one valuable matter comprising material is present in form of an ore mineral.

(14) The process according to any one of items (1) to (13), wherein dispersion I in step (A) comprises ore-bearing slag and/or wet ore tailing comprising at least one valuable matter containing material.

(15) The process according to any one of items (1) to (14), wherein dispersion I obtained in step (B) comprises from about 5 to about 40% by weight solid content wherein the solid content is based on the total amount of solids present.

(16) The process according to any one of items (1) to (15), wherein the magnetic particle is selected from the group consisting of magnetic metals and mixtures thereof, ferromagnetic alloys of magnetic metals and mixtures thereof, magnetic iron oxides, or cubic ferrites of general formula (II)

$$M^{2+}_{x}Fe^{2+}_{1-x}Fe^{3+}_{2}O_4 \quad (II)$$

wherein
M is selected from Co, Ni, Mn, Zn and mixtures thereof and x is ≤1,
hexagonal ferrites and mixtures thereof.

(17) The process according to any one of items (1) to (16), wherein the at least one magnetic particle is a hydrophobized magnetic particle.

(18) The process according to item (17), wherein the at least one hydrophobized magnetic particle is a magnetic particle treated with a hydrophobizing agent.

(19) The process according to item (18), wherein the hydrophobizing agent is a compound of formula (IV) or derivative thereof $$R^5_y\text{—}Si(OR^6)_{4-y} \quad (IV)$$

wherein each $R^5$ is independently selected from hydrogen; linear or branched, optionally substituted $C_1$-$C_{30}$-alkyl; linear or branched, optionally substituted $C_2$-$C_{30}$-alkenyl; linear or branched, optionally substituted $C_2$-$C_{30}$-alkynyl; optionally substituted $C_3$-$C_{20}$-cycloalkyl; optionally substituted $C_3$-$C_{20}$-cycloalkenyl; optionally substituted $C_1$-$C_{20}$-heteroalkyl; optionally substituted $C_5$-$C_{22}$-aryl; optionally substituted $C_6$-$C_{23}$-alkylaryl; optionally substituted $C_6$-$C_{23}$-arylalkyl; optionally substituted $C_5$-$C_{22}$-heteroaryl;

each $R^6$ is independently selected from hydrogen; linear or branched, optionally substituted $C_1$-$C_{30}$-alkyl; linear or branched, optionally substituted $C_2$-$C_{30}$-alkenyl; linear or branched, optionally substituted $C_2$-$C_{30}$-alkynyl; optionally substituted $C_3$-$C_{20}$-cycloalkyl; optionally substituted $C_3$-$C_{20}$-cycloalkenyl; optionally substituted $C_1$-$C_{20}$-heteroalkyl; optionally substituted $C_5$-$C_{22}$-aryl; optionally substituted $C_6$-$C_{23}$-alkylaryl; optionally substituted $C_6$-$C_{23}$-arylalkyl; optionally substituted $C_6$-$C_{22}$-heteroaryl;
and v is the Integer 1, 2 or 3.

(20) The process according to item (19), wherein the compound of formula (IV) or derivative thereof is a compound selected from the group consisting of $(NaO)(CH_3)Si(OH)_2$, $(NaO)(C_2H_5)Si(OH)_2$, $(NaO)(C_5H_{11})Si(OH)_2$, $(NaO)(C_8H_{17})S(OH)_2$, $(KO)(CH_3)Si(OH)_2$, $(KO)(C_2H_5)Si(OH)_2$, $(KO)(C_5H_{11})Si(OH)_2$, $(KO)(C_8H_{17})Si(OH)_2$, $(NH_4O)(CH_3)Si(OH)_2$, $(NH_4O)(C_2H_5)Si(OH)_2$, $(NH_4O)(C_5H_{11})Si(OH)_2$, $(NH_4O)(C_8H_{17})Si(OH)_2$, $(NaO)_2(CH_3)Si(OH)$, $(NaO)_2(C_2H_5)Si(OH)$, $(NaO)_2(C_5H_{11})Si(OH)$, $(NaO)_2(C_8H_{17})Si(OH)$, $(KO)_2(CH_3)Si(OH)$, $(KO)_2(C_2H_5)Si(OH)$, $(KO)_2(C_5H_{11})Si(OH)$, $(KO)_2(C_8H_{17})Si(OH)$, $(NH_4O)_2(CH_3)Si(OH)$, $(NH_4O)_2(C_2H_5)Si(OH)$, $(NH_4O)_2(C_5H_{11})Si(OH)$, $(NH_4O)_2(C_8H_{17})Si(OH)$, $(NaO)_3(CH_3)Si$, $(NaO)_3(C_2H_5)Si$, $(NaO)_3(C_5H_{11})Si$, $(NaO)_3(C_8H_{17})Si$, $(KO)_3(CH_3)Si$, $(KO)_3(C_2H_5)Si$, $(KO)_3(C_5H_{11})Si$, $(KO)_3(C_8H_{17})Si$, $(NH_4O)_3(CH_3)Si$, $(NH_4O)_3(C_2H_5)Si$, $(NH_4O)_3(C_5H_{11})Si$, $(NH_4O)_3(C_8H_{17})Si$, $(NaO)(CH_3)_2Si(OH)$, $(NaO)(C_2H_5)_2Si(OH)$, $(KO)(CH_3)_2Si(OH)$, $(KO)(C_2H_5)_2Si(OH)$, $(NaO)_2(CH_3)_2Si$, $(NaO)_2(C_2H_5)_2Si$, $(KO)_2(CH_3)_2Si$, $(KO)_2(C_2H_5)_2Si$, $Ca^{2+}[(O^-)(CH_3)Si(OH)_2]_2$, $Ca^{2+}[(O^-)(C_2H_5)Si(OH)_2]_2$, $Ca^{2+}[(O^-)(C_5H_{11})Si(OH)_2]_2$, $Ca^2[(O^-)(C_8H_{17})Si(OH)_2]_2$, $Ca^{2+}[(O^-)(CH_3)_2Si(OH)]_2$, $Ca^{2+}[(O^-)(C_2H_5)_2Si(OH)]_2$, $Ca^{2+}[(O^-)_2(CH_3)Si(OH)]$, $Ca^{2+}[(O^-)_2(C_2H_5)Si(OH)]$, $Ca^{2+}[(O^-)_2(C_5H_{11})Si(OH)]$, $Ca^{2+}[(O^-)_2(C_8H_{17})Si(OH)]$, $Ca^{2+}[(O^-)_2(CH_3)_2Si]$, $Ca^{2+}[(O^-)_2(C_2H_5)_2Si]$ or combinations thereof.

(21) The process according to any one of items (1) to (20), wherein in step (B) the magnetic particle and the at least one valuable matter containing material form an agglomerate.

(22) The process according to any one of items (1) to (21), wherein the dispersion medium II is water.

(23) The process according to any one of items (1) to (22), wherein the at least one valuable matter containing material and the at least one second material are comminuted to particles having a particles size of from about 100 nm to about 400 μm in or before step (A) or (B).

(24) The process according to any one of items (1) to (23), wherein steps (D) and (E) are repeated 1 to 4 times.

(25) A process according to any one of items (1) to (24) further comprising step (F) that is conducted after step (E):
(F) redispersing the at least one magnetic fraction II in dispersion medium III to obtain a dispersion III.

(26) A process according to item (25) further comprising step (G) that is conducted after step (F):
(G) separating dispersion III into a third magnetic fraction III and a non-magnetic fraction and isolating the at least one valuable matter containing material from the non-magnetic fraction.

(27) The process according to any one of items (1) to (26), further comprising step (H) that is conducted after step (E) or after step (G):
(H) processing of the at least one magnetic fraction II obtained in step (E), the non-magnetic fraction obtained in step (G) and/or the isolated at least one valuable matter containing material obtained in step (G) by smelting, extracting and/or wet chemical refining.

Examples

Example 1: Measurement of the Mean Particle Size

The measurement was carried out in a Mastersizer 2000 with software version 5.12G. The sample was dispersed in 2.98% by weight $Na_4P_2O_7$ solution in water via ultrasound irradiation with stirring. In case of the hydrophobic magnetite, isopropyl alcohol as dispersion medium was used. The measurements of 1 ml sample suspension were carried out for 10 sec under ultrasound irradiation at concentrations of about 0.01% (Laser Diffraction Measurement).

Example 2: Preparation of Hydrophobized Magnetite as Magnetic Particles

Hydrophobized magnetite is prepared by wetting magnetite-pigment MP345 (BASF SE) with 4.0% by weight of a solution of a potassium methylsiliconate in water (ca. 34% by weight active substance). The volatiles were removed in vacuum and the solids were kept under $CO_2$ atmosphere for 18 h at 120° C. The solids were washed with water until neutral pH (corresponding to 24 μS/m electrical conductivity) and dried in vacuum at 120° C. to afford a hydrophobized magnetic carrier. The mean particle size $d_{50}$ of the hydrophobized magnetite is adjusted to $d_{50}$ of 3 μm to 8 μm determined according to Example 1.

As known to the skilled artisan the "$d_{50}$" means that 50% by weight of all particles present have a diameter smaller than the mentioned values.

Example 3: Comparative Example Using Wet or Tailing as First Material

Wet ore tailing with 84% by weight solid content corresponding to 300 g of dry material and containing 0.98 ppm by weight Pd and 0.2 ppm by weight Pt (based on dry material) were agitated with 84 g water, 900 g of yttrium-stabilized $ZrO_2$ grinding balls (diameter 1.7 to 2.2 mm), 212 mg of potassium di-n-octyl-xanthate (1:1-salt of carbonodithioic acid O-octyl ester, 92% purity). The agitation was carried out for 15 min in a 500 ml $ZrO_2$-inlined jar in a planetary ball mill PM400 at 200 rpm with 1:2 ratio of rotational speeds (no direction change) followed by addition 15 g of a hydrophobized magnetic carrier, prepared according to example 2 and dispersed in 10 ml of iso-propyl alcohol before addition. The agitation was continued for further 5 min. The solids were separated from the grinding medium by water flushing in such a way that a solid concentration of 20% by weight was achieved. The suspension was transferred into a conical stirring vessel. The stirring was carried out at an impeller speed preventing sedimentation of the solids (ca. 600 rpm). The suspension was passed through a magnetic separator (first, or "load" separation step) similar to that described in WO 2012/104292. Two fractions were isolated: the non-magnetic "tailings" fraction with low valuable content and the magnetic ("loaded magnetic") fraction. The "tailings" fraction was filtered, dried and analyzed on PGM (Pd and Pt) content. The "loaded magnetics" fraction was suspended in 2 L of 0.1% by weight solution of a non-ionic surfactant (BASF SE, $C_{10}$-Guebert alcohol ethoxylated with 8 ethylene oxide units having HLB-value of 14 and critical micelle concentration 0.44 g/L) at and stirred for 5 min at 850 rpm at a solid content of ca. 1% by weight. The suspension obtained was passed through a magnetic separator (second, or "unload" separation step) similar to that described in WO 2012/104292. Two fractions were obtained: the non-magnetic, "concentrate" fraction enriched in valuables and the magnetic fraction "unloaded magnetics" containing only the rest of the deagglomerated valuables. The fractions were further isolated via flitration, dried and analysed by fire assay on valuable content.

The valuable distribution into the isolated fractions is calculated in the following way. For the example, after the separation experiment the "tailing" fraction having the mass m contains x % by weight of valuable 1, the isolated "unloaded magnetics" fraction having the mass n contains y % by weight of valuable 1, and the isolated "concentrate" fraction having the mass p and z % by weight of valuable 1. The distribution (yield) of valuable 1 in the fractions (W) will be:

For the "tailings" fraction:

$$W(\text{"tailings"})=100\%*m*x/(m*x+n*y+p*z)$$

For the "unloaded magnetics" fraction:

$$W(\text{"unloaded magnetics"})=100\%*n*y/(m*x+n*y+p*z)$$

For the "concentrate" fraction:

$$W(\text{"concentrate"})=100\%*p*z/(m*x+n*y+p*z)$$

Higher valuable yields in the "concentrate" and "unloaded magnetics" fraction W evidence higher degree of separation. The higher valuable content in the "concentrate" fraction corresponds to a higher concentrate grade and evidences the higher concentrate quality.

In example 3, after both separation steps, 24% Pd and 29% Pt were distributed into the "concentrate" fraction, 6% Pd and 29% Pt were distributed into the "unloaded magnetics" fraction with rest of the valuables remained unrecovered in the "tailings" fraction. The concentrate fraction contained only 16 ppm Pd and 2.8 ppm Pt.

Example 4: Effect of Lower Solid Content Before the Separation Step

This example was carried out according to the example 3, but the solid content before the first "load" separation step was adjusted to 10% by weight. After both separation steps, 26% Pd and 23% Pt were distributed into the "concentrate" fraction, 5% Pd and 22% Pt were distributed into the "unloaded magnetics" fraction with rest of the valuables remained unrecovered in the "tallings" fraction. The "concentrate" fraction contained 29.8 ppm Pd and 5.1 ppm Pt demonstrating the positive effect of the back flush. At a lower solid content, less gangue can be entrapped between the agglomerated in the magnetic field particles of the loaded magnetic fraction thus affording the higher concentrate grade. This example shows that the solid content of the dispersion before the first separation step has a certain effect onto the separation efficiency, but the separation efficiency is not as good as it is possible with the process of the present invention.

Example 5: Example According to the Invention Using Wet Ore Tailing as First Material Wet ore tailing with 84% by weight solid content corresponding to 300 g of dry material and containing 0.98 ppm Pd and 0.2 ppm Pt (based on dry material) were agitated with 84 g water, 900 g of yttrium-stabilized $ZrO_2$ grinding balls (diameter of 1.7 to 2.2 mm), 212 mg of potassium n-octyl-xanthate (1:1-salt of carbonodithioic acid O-octyl ester, 92% purity). The agitation was carried out for 15 min in a 500 ml $ZrO_2$-inlined jar in a planetary ball mill PM400 at 200 rpm with 1:2 ratio of rotational speeds (no direction change) followed by addition 15 g of a hydrophobized magnetic carrier (prepared according to example 2 and dispersed in 10 ml of iso-propyl alcohol before addition). The agitation was continued for further 5 min. The solids were separated from the grinding media by water flushing in such a way that 20 wt. % solid concentration was achieved. The suspension was transferred into a conical stirring vessel. The stirring was carried out at an impeller speed preventing sedimentation of the solids (ca. 600 rpm). The suspension was passed through a magnetic separator (first, or "load" separation step) similar to that described in WO 2012/104292. Two fractions were isolated: the non-magnetic "tailings" fraction with low valuable content and the magnetic ("loaded magnetic") fraction. The "tailings" fraction was filtered, dried and analyzed on PGM (Pd and Pt) content. The "loaded magnetics" fraction was suspended in a conical vessel and the volume of the suspension was increased to 2 L. The suspension of "loaded magnetics" was stirred for 5 min at 350 rpm to allow the entrapped gangue be released from the cavities between the magnetic agglomerates. The suspension of the "loaded magnetics" was passed through a magnetic separator (second, or "cleaner" separation step) similar to that described in WO 2012/104292. Two fractions were isolated: the non-magnetic "cleaner tailings" fraction with low valuable content and the magnetic ("cleaned loaded magnetic") fraction. The "cleaner tailings" fraction was filtered, dried and analyzed on PGM (Pd and Pt) content. The "cleaned loaded magnetics" fraction was suspended in 2 L of 0.1 wt. % solution of a non-ionic surfactant (BASF SE, $C_{10}$-Guebert alcohol ethoxylated with 8 ethylene oxide units having HLB-value of 14 and critical micelle concentration 0.44 g/L) at and stirred for 5 min at 850 rpm at a solid content of ca. 1% by weight. The suspension obtained was passed through a magnetic separator (third, or "unload" separation step) similar to that described in WO 2012/104292. Two fractions were obtained: the non-magnetic, "concentrate" fraction enriched in valuables and the magnetic fraction "unloaded magnetics" containing only the rest of the deagglomerated valuables. The fractions were further isolated via filtration, dried and analyzed on valuable content.

The valuable (Pd, Pt) distribution into the isolated "tailings", "cleaner tailings", "unloaded magnetics" and "concentrate" fractions was calculated similar to example 3 and the fourth fraction ("cleaner tailings") was included in the calculations.

After the separation steps, 18% Pd and 17% Pt were distributed into the "concentrate" fraction, 5% Pd and 25% Pt were distributed into the "unloaded magnetics" fraction, 7% Pd and 7% Pt were distributed into the "cleaner tailings" fraction with the rest of the valuables remained unrecovered in the "tailings" fraction. The isolated "concentrate" fraction contained 76 ppm Pd and 12.8 ppm Pt demonstrating the surprisingly strong positive effect of the additional cleaner separation step when compared to the example 3. It is clearly seen that significant part of valuables (7%) remains in the "cleaner tails". This part of valuable is not lost but can be recycled if combined with fresh ore tailings and carrying out the separation steps like described above. In the same way, the isolated "unloaded magnetics" can be utilized again (i.e. recycled) in the any of the separation steps as described.

The next examples demonstrate the advantages of the cleaner step when applied on South African platinum ore tailings from the Merensky reef.

Example 6: Comparative 100 g of Merensky reef tailings of a South African mine containing 0.65 ppm Pt, 0.25 ppm Pd and 0.1 ppm Rh were agitated with 75 g water, 0.033 g sodium sulfide ($Na_2S$), 5 drops of 20% by weight Antiprex 6340 solution (Grinding Aid, BASF SE, Antiprex 6340 solution is an aqueous solution of partially neutralized low molecular weight sodium polyacrylate), 0.065 mg of potassium n-octyl-xanthate (1:1-salt of carbonodithioic acid O-octyl ester, 92% purity), 0.04 g of Shellsol D80 (Shell), 160 ml of yttrium-stabilized $ZrO_2$ grinding balls (diameter of 4 mm). The agitation was carried out for 10 min in a 500 ml $ZrO_2$-inlined jar in Retsch S100 vibrating mill at 394 rpm followed by addition 3 g of a hydrophobized magnetic carrier, prepared according to method 2 and dispersed in 5 ml of iso-propyl alcohol before addition. The agitation was continued for further 5 min. This procedure was repeated for three times in order to obtain enough material for the subsequent separation. The solids were separated from the grinding medium by water flushing in such a way that about 10% by weight solid concentration was achieved. The suspension was transferred into a conical stirring vessel. The stirring was carried out at an impeller speed preventing sedimentation of the solids (ca. 600 rpm). The suspension was passed through a magnetic separator (first, or "load" separation step) similar to that described in WO 2012/104292. Two fractions were isolated: the non-magnetic "tailings" fraction with low valuable content and the magnetic ("loaded magnetic") fraction. The "tailings" fraction was filtered, dried at 110° C. and analyzed on PGM (Pd and Pt) content. The "loaded magnetics" fraction was suspended in 1 L of 0.1% by weight solution of a non-ionic surfactant (BASF SE, C10-Guebert alcohol ethoxylated with 8 ethylene oxide units having HLB-value of 14 and critical micelle concentration 0.44 g/L) at and stirred for 15 min at 800 rpm at a solid content of ca. 1% by weight. The suspension obtained was passed through a magnetic separator (second, or "unload" separation step) similar to that described in WO 2012/104292. Two fractions were obtained: the non-magnetic, "concentrate" fraction enriched in valuables and the magnetic fraction "unloaded magnetics" containing only the rest of the deagglomerated valuables. The fractions were further isolated via filtration, dried at 110° C. and analyzed on valuable content.

The valuable distribution into the isolated fractions is calculated like in example 3.

After both separation steps, 56% Pt and 60% Pd were distributed into the "concentrate" fraction, 2% Pt and 1% Pd were distributed into the "unloaded magnetics" fraction with rest of the valuables remained unrecovered in the "tailings" fraction. The "concentrate" fraction contained 160 ppm Pt, 74 ppm Pd, 28 ppm Rh and 20% Cr.

Example 7: According to the Invention 100 g of Merensky reef tailings of a South African mine containing 0.65 ppm Pt, 0.25 ppm Pd and 0.1 ppm Rh were agitated with 75 g water, 0.033 g sodium sulfide ($Na_2S$), 5 drops of 20% by weight Antiprex 6340 solution (BASF SE), 0.065 mg of potassium n-octyl-xanthate [(1:1) salt of carbonodithioic acid O-octyl ester, 92% purity], 0.04 g of Shellsol D80 (Fa. Shell), 160 ml of yttrium-stabilized $ZrO_2$ grinding balls (diameter of 4 mm). The agitation was carried out for 10 min in a 500 ml $ZrO_2$-inlined jar in Retsch S100 vibrating mill at 394 rpm followed by addition 3 g of a hydrophobized magnetic carrier (prepared according to method 2 and dispersed in 5 ml of iso-propyl alcohol before addition). The agitation was continued for further 5 min. This procedure was repeated for three times in order to obtain enough material for the subsequent separation. The solids were separated from the grinding media by water flushing in such a way that ca. 10% by weight solid concentration was achieved. The suspension was transferred into a conical stirring vessel. The stirring was carried out at an impeller speed preventing sedimentation of the solids (ca. 600 rpm). The suspension was passed through a magnetic separator (first, or "load" separation step) similar to that described in WO 2012/104292. Two fractions were isolated: the non-magnetic "tailings" fraction with low valuable content and the magnetic ("loaded magnetic") fraction. The "tailings" fraction was filtered, dried at 110° C. and analyzed on PGM (Pd and Pt) content. The "loaded magnetics" fraction was suspended in a conical vessel to allow the entrapped gangue be released from the cavities between the magnetic agglomerates. The suspension of the "loaded magnetics" was decanted by means of a permanent magnet (second, or "cleaner" separation step) from the non-magnetic gangue remained suspended in suspension. Two fractions were isolated: the non-magnetic gangue "cleaner tailings" fraction with low valuable content and the magnetic ("cleaned loaded magnetic") fraction. The "cleaner tailings" fraction was filtered, dried and analyzed on PGM (Pd and Pt) content.

The "cleaned loaded magnetics" fraction was suspended in 1 L of 0.1% by weight solution of a non-ionic surfactant (BASF SE, $C_{10}$-Guebert alcohol ethoxylated with 8 ethylene oxide units having HLB-value of 14 and critical micelle concentration 0.44 g/L) at and stirred for 15 min at 850 rpm at a solid content of ca. 1% by weight. The suspension obtained was passed through a magnetic separator (third, or "unload" separation step) similar to that described in WO 2012/104292. Two fractions were obtained: the non-magnetic, "concentrate" fraction enriched in valuables and the magnetic fraction "unloaded magnetics" containing only the rest of the deagglomerated valuables. The fractions were further isolated via filtration, dried and analyzed on valuable content.

The valuable (Pd, Pt) distribution into the isolated "tailings", "cleaner tailings", "unloaded magnetics" and "concentrate" fractions was calculated similar to example 1 save the fourth fraction ("cleaner tailings") was included in the calculations.

After the separation steps, 59% Pt and 62% Pd and were distributed into the "concentrate" fraction, 3% Pt and 2% Pd were distributed into the "unloaded magnetics" fraction, with the rest of the valuables being distributed into the "cleaner tailings" fraction and/or remained unrecovered in the "tailings" fraction. The isolated "concentrate" fraction contained 380 ppm Pt, 175 ppm Pd, 64 ppm Rh and 15% Cr demonstrating the surprisingly strong positive effect of the additional cleaner separation step on the concentrate grades when compared to the example 6. In addition, the amount of chromium in form of the chromium minerals is significantly decreased. Most probably, weakly magnetic chromite mineral gets released during the additional cleaning separation step along with other gangue types entrapped between the particles of the magnetic agglomerates.

The grades obtained in the respective examples 3, 5, 6 and 7 are summarized in Table 1.

TABLE 1

| | Pt [ppm] | Pd [ppm] | Rh [ppm] | Cr [%] |
|---|---|---|---|---|
| Example 3 | 2.8 | 16 | | |
| Example 5 (inventive) | 12.8 | 76 | | |
| Example 6 | 160 | 74 | 28 | 20 |
| Example 7 (inventive) | 380 | 175 | 64 | 15 |

The invention claimed is:

1. A process for the separation of at least one valuable matter containing material from a dispersion comprising said at least one valuable matter containing material and at least one second material, wherein the process comprises the following steps:
   (A) providing a first dispersion I comprising a dispersion medium I, the at least one valuable matter containing material and the at least one second material;
   (B) contacting dispersion I of step (A) with at least one magnetic particle and allowing that only the at least one valuable matter containing material and the at least one magnetic particle agglomerate in step (B) while the at least one second material and the at least one magnetic particle do not or essentially do not agglomerate together;
   (C) separating a first magnetic fraction I from dispersion I by applying a magnetic field, wherein the magnetic fraction I comprises the at least one magnetic particle and the at least one valuable matter containing material in the form of the agglomerate formed in step (B), wherein in step (C) the magnetic fraction I and a non-magnetic fraction are obtained;
   (D) redispersing the magnetic fraction I in at least one dispersion medium II to obtain a dispersion II; and
   (E) separating a second magnetic fraction II from dispersion II, wherein the magnetic fraction II comprises at least one magnetic particle and at least one valuable matter containing material.

2. The process according to claim 1, wherein said at least one dispersion medium II is water.

3. The process according to claim 1, wherein the separation of magnetic fraction II from dispersion II in step (E) is conducted by a method selected from the group consisting of applying a magnetic field, flotation, dense media separation, gravity separation, spiral concentrator and combinations thereof.

4. The process according to claim 1, wherein the valuable matter containing material of the magnetic fraction I in step (C) has a first grade of at least one valuable matter and wherein the valuable matter containing material of the magnetic fraction II in step (E) has a second grade of the at least one valuable matter,
   wherein the second grade of the at least one valuable matter obtained in step (E) is higher than the first grade of the at least one valuable matter obtained in step (C), and wherein the ratio of the second grade to the first grade of the at least one valuable matter is at least 1.2.

5. The process according to claim 4, wherein the ratio of the second grade to the first grade of the at least one valuable matter is at least 4.0.

6. The process according to claim 1, wherein the at least one valuable matter containing material has been pre-treated with at least one collector or wherein at least one collector is added in step (A) or (B),
   and wherein the at least one collector is an ionizing collector or a non-ionizing collector.

7. The process according to claim 6, wherein said at least one collector is a compound of formula (I) or derivative thereof

and wherein
   each A is independently selected from $C_1$-$C_{30}$-alkyl, $C_2$-$C_{30}$-alkenyl, $C_1$-$C_{30}$-heteroalkyl, $C_6$-$C_{30}$-aryl, $C_6$-$C_{30}$-cycloalkyl, $C_6$-$C_{30}$-heteroalkyl, $C_6$-$C_{30}$-hetero-cycloalkyl, $C_6$-$C_{30}$-aralkyl, each of which may be unsubstituted or optionally substituted;
   each Z is independently selected from anionic groups, cationic groups or non-ionic groups;
   m is an integer of 1, 2, 3, 4, 5, 6, 7, 8, 9 or 10;
   n is an integer of 1, 2, 3, 4, 5, 6, 7, 8, 9 or 10; and
   o is an integer of 1, 2, 3, 4, 5, 6, 7, 8, 9 or 10 to 100.

8. The process according to claim 7, wherein Z is selected from:
a)

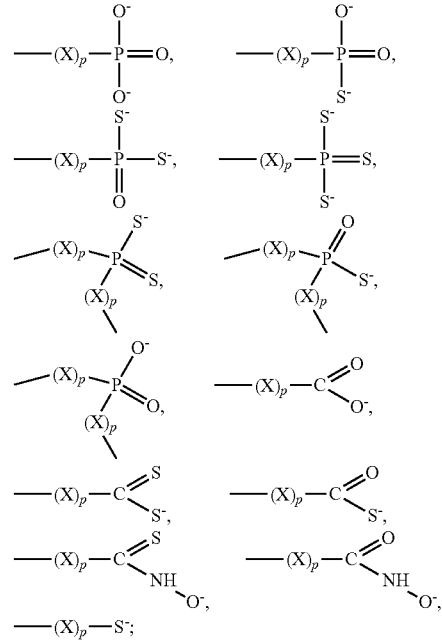

b)

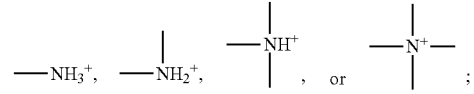

or c)

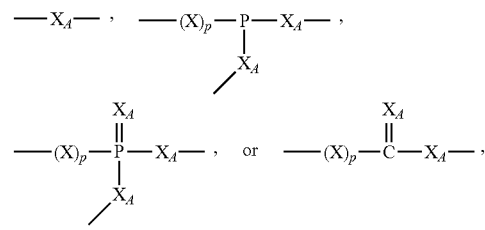

wherein each X is independently selected from the group consisting of O, S, NH, $CH_2$ and each p is independently selected from the integer 0, 1 or 2 and each $X_A$ is independently selected from O or S.

9. The process according to claim 7, wherein said at least one collector is

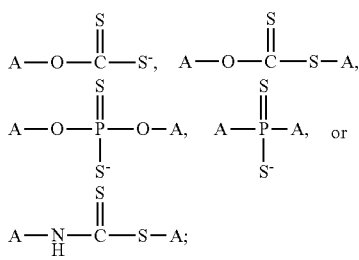

or a derivative thereof.

10. The process according to claim 1, wherein the at least one valuable matter is selected from the group consisting of Ag, Au, Pt, Pd, Rh, Ru, Ir, Os, Cu, Mo, Ni, Mn, Zn, Pb, Te, Sn, Hg, Re, V, Fe; and combinations or alloys thereof.

11. The process according to claim 1, wherein the at least one valuable matter is selected from the group consisting of Ru, Rh, Pd, Os, Ir, Pt; and combinations or alloys thereof.

12. The process according to claim 1, wherein the at least one valuable matter comprising material is present in form of an ore mineral.

13. The process according to claim 1, wherein dispersion I in step (A) comprises ore-bearing slag and/or wet ore tailing comprising at least one valuable matter containing material.

14. The process according to claim 1, wherein the dispersion obtained in step (B) comprises from about 5 to about 40% by weight solid content wherein the solid content is based on the total amount of solids present.

15. The process according to claim 1, wherein the magnetic particle is selected from the group consisting of magnetic metals and mixtures thereof, ferromagnetic alloys of magnetic metals and mixtures thereof, magnetic iron oxides of general formula (II)

wherein
M is selected from Co, Ni, Mn, Zn or mixtures thereof and x is ≤1,
and mixtures thereof.

16. The process according to claim 1, wherein the at least one magnetic particle is a hydrophobized magnetic particle.

17. The process according to claim 16, wherein the at least one hydrophobized magnetic particle is a magnetic particle treated with a hydrophobizing agent, and the hydrophobizing agent is a compound of formula (IV) or derivative thereof

wherein each $R^5$ is independently selected from hydrogen; linear or branched, optionally substituted $C_1$-$C_{30}$-alkyl; linear or branched, optionally substituted $C_2$-$C_{30}$-alkenyl; linear or branched, optionally substituted $C_2$-$C_{30}$-alkynyl; optionally substituted $C_3$-$C_{20}$-cycloalkyl; optionally substituted $C_3$-$C_{20}$-cycloalkenyl; optionally substituted $C_1$-$C_{20}$-heteroalkyl; optionally substituted $C_5$-$C_{22}$-aryl; optionally substituted $C_6$-$C_{23}$-alkylaryl; optionally substituted $C_6$-$C_{23}$-arylalkyl; optionally substituted $C_5$-$C_{22}$-heteroaryl;

each $R^6$ is independently selected from hydrogen; linear or branched, optionally substituted $C_1$-$C_{30}$-alkyl; linear or branched, optionally substituted $C_2$-$C_{30}$-alkenyl; linear or branched, optionally substituted $C_2$-$C_{30}$-alkynyl; optionally substituted $C_3$-$C_{20}$-cycloalkyl; optionally substituted $C_3$-$C_{20}$-cycloalkenyl; optionally substituted $C_1$-$C_{20}$-heteroalkyl; optionally substituted $C_5$-$C_{22}$-aryl; optionally substituted $C_6$-$C_{23}$-alkylaryl; optionally substituted $C_6$-$C_{23}$-arylalkyl; optionally substituted $C_5$-$C_{22}$-heteroaryl;

and v is the integer 1, 2 or 3.

18. The process according to claim 17, wherein the compound of formula (IV) or derivative thereof is a compound selected from the group consisting of (NaO)(CH$_3$)Si(OH)$_2$, (NaO)(C$_2$H$_5$)Si(OH)$_2$, (NaO)(C$_5$H$_{11}$)Si(OH)$_2$, (NaO)(C$_8$H$_{17}$)Si(OH)$_2$, (KO)(CH$_3$)Si(OH)$_2$, (KO)(C$_2$H$_5$)Si(OH)$_2$, (KO)(C$_5$H$_{11}$)Si(OH)$_2$, (KO)(C$_8$H$_{17}$)Si(OH)$_2$, (NH$_4$O)(CH$_3$)Si(OH)$_2$, (NH$_4$O)(C$_2$H$_5$)Si(OH)$_2$, (NH$_4$O)(C$_5$H$_{11}$)Si(OH)$_2$, (NH$_4$O)(C$_8$H17)Si(OH)$_2$, (NaO)$_2$(CH$_3$)Si(OH), (NaO)$_2$(C$_2$H$_5$)Si(OH), (NaO)$_2$(C$_5$H$_{11}$)Si(OH), (NaO)$_2$(C$_8$H$_{17}$)Si(OH), (KO)$_2$(CH$_3$)Si(OH), (KO)$_2$(C$_2$H$_5$)Si(OH), (KO)$_2$(C$_5$H$_{11}$)Si(OH), (KO)$_2$(C$_8$H$_{17}$)Si(OH), (NH$_4$O)$_2$(CH$_3$)Si(OH), (NH$_4$O)$_2$(C$_2$H$_5$)Si(OH), (NH$_4$O)$_2$(C$_5$H$_{11}$)Si(OH), (NH$_4$O)$_2$(C$_8$H$_{17}$)Si(OH), (NaO)$_3$(CH$_3$)Si, (NaO)$_3$(C$_2$H$_5$)Si, (NaO)$_3$(C$_5$H$_{11}$)Si, (NaO)$_3$(C$_8$H$_{17}$)Si, (KO)$_3$(CH$_3$)Si, (KO)$_3$(C$_2$H$_5$)Si, (KO)$_3$(C$_5$H$_{11}$)Si, (KO)$_3$(C$_8$H$_{17}$)Si, (NH$_4$O)$_3$(CH$_3$)Si, (NH$_4$O)$_3$(C$_2$H$_5$)Si, (NH$_4$O)$_3$(C$_5$H$_{11}$)Si, (NH$_4$O)$_3$(C$_8$H$_{17}$)Si, (NaO)(CH$_3$)$_2$Si(OH), (NaO)(C$_2$H$_5$)$_2$Si(OH), (KO)(CH$_3$)$_2$Si(OH), (KO)(C$_2$H$_5$)$_2$Si(OH), (NaO)$_2$(CH$_3$)$_2$Si, (NaO)$_2$(C$_2$H$_5$)$_2$Si, (KO)$_2$(CH$_3$)$_2$Si, (KO)$_2$(C$_2$H$_5$)$_2$Si, Ca$^{2+}$[(O$^-$)(CH$_3$)Si(OH)$_2$]$_2$, Ca$^{2+}$[(O$^-$)(C$_2$H$_5$)Si(OH)$_2$]$_2$, Ca$^{2+}$[(O$^-$)(C$_5$H$_{11}$)Si(OH)$_2$]$_2$, Ca$^{2+}$[(O$^-$)(C$_8$H$_{17}$)Si(OH)$_2$]$_2$, Ca$^{2+}$[(O$^-$)(CH$_3$)$_2$Si(OH)]$_2$, Ca$^{2+}$[(O$^-$)(C$_2$H$_5$)$_2$Si(OH)]$_2$, Ca$^{2+}$[(O$^-$)$_2$(CH$_3$)Si(OH)], Ca$^{2+}$[(O$^-$)$_2$(C$_2$H$_5$)Si(OH)], Ca$^{2+}$[(O$^-$)$_2$(C$_5$H$_{11}$)Si(OH)], Ca$^{2+}$[(O$^-$)$_2$(C$_8$H$_{17}$)Si(OH)], Ca$^{2+}$[(O$^-$)$_2$(CH$_3$)$_2$Si], Ca$^{2+}$[(O$^-$)$_2$(C$_2$H$_5$)$_2$Si] and combinations thereof.

19. The process according to claim 1, wherein the at least one valuable matter containing material and the at least one second material are comminuted to particles having a particle size of from about 100 nm to about 400 μm in or before step (A) or (B).

20. The process according to claim 1, wherein steps (D) and (E) are repeated 1, 2, 3 or 4 times.

21. A process according to claim 1 further comprising step (F) that is conducted after step (E):

(F) redispersing the at least one magnetic fraction II in dispersion medium III to obtain a dispersion III;

and optionally further comprising step (G) that is conducted after step (F):

(G) separating dispersion III into a third magnetic fraction III and a non-magnetic fraction and isolating the at least one valuable matter containing material from the non-magnetic fraction.

22. The process according to claim 21, further comprising step (H) and optionally step (G) wherein step (H) is conducted after step (E) or after step (G):

(H) processing of the at least one magnetic fraction II obtained in step (E), the non-magnetic fraction obtained in step (G) and/or the isolated at least one valuable matter containing material obtained in step (G) by smelting, extracting and/or wet chemical refining.

23. The process according to claim 1, wherein the magnetic fraction I obtained in step (C) comprises at least 60% by weight of magnetic constituents, based on the total weight of magnetic constituents in dispersion I.

24. The process according to claim 1, wherein the magnetic fraction I obtained in step (C) comprises at least 90% of magnetic constituents, based on the total weight of magnetic constituents in dispersion I.

\* \* \* \* \*